United States Patent [19]
Haydon et al.

[11] 3,903,515
[45] Sept. 2, 1975

[54] METHOD OF AND APPARATUS FOR CONTROLLING THE PERFORMANCE OF TIMED FUNCTIONS

[75] Inventors: Arthur W. Haydon, Middlebury, Conn.; Lew F. Ozimek, Northport, N.Y.

[73] Assignee: Tri-Tech, Inc., Waterbury, Conn.

[22] Filed: Sept. 5, 1974

[21] Appl. No.: 503,390

[52] U.S. Cl. ............................ 340/309.4; 340/309.1
[51] Int. Cl. .......................................... H01h 43/00
[58] Field of Search ....... 340/309.4, 309.1; 307/141

[56] References Cited
UNITED STATES PATENTS
3,790,815  2/1974  Karklys ......................... 340/309.4 X

*Primary Examiner*—Harold I. Pitts
*Attorney, Agent, or Firm*—Lee C. Robinson, Jr.

[57] ABSTRACT

A method of and apparatus for controlling the selective performance of a plurality of predetermined functions at preselected times. Time and function data representing functions to be performed and the times at which such functions are to be performed are generated. This time and function data are stored in a memory at available storage locations. The stored data is compared to data which is produced by a clock and which represents the time of day then obtaining. If the actual time of day compares to stored time data, then the function represented by the stored function data which is associated with the stored time data is performed. If a particular function is no longer to be performed, or is to be changed, the data representing that function is located in the memory and is erased. New data representing another function and time of performance may then be stored in place of the erased data. The contents of the memory may be completely erased so as to delete all previously stored time and function data from the memory.

35 Claims, 12 Drawing Figures

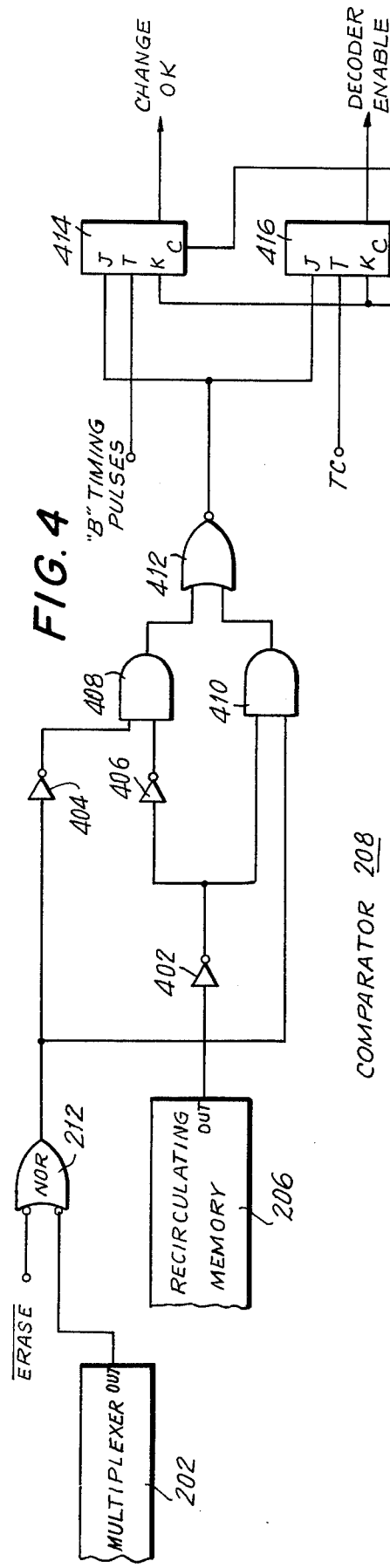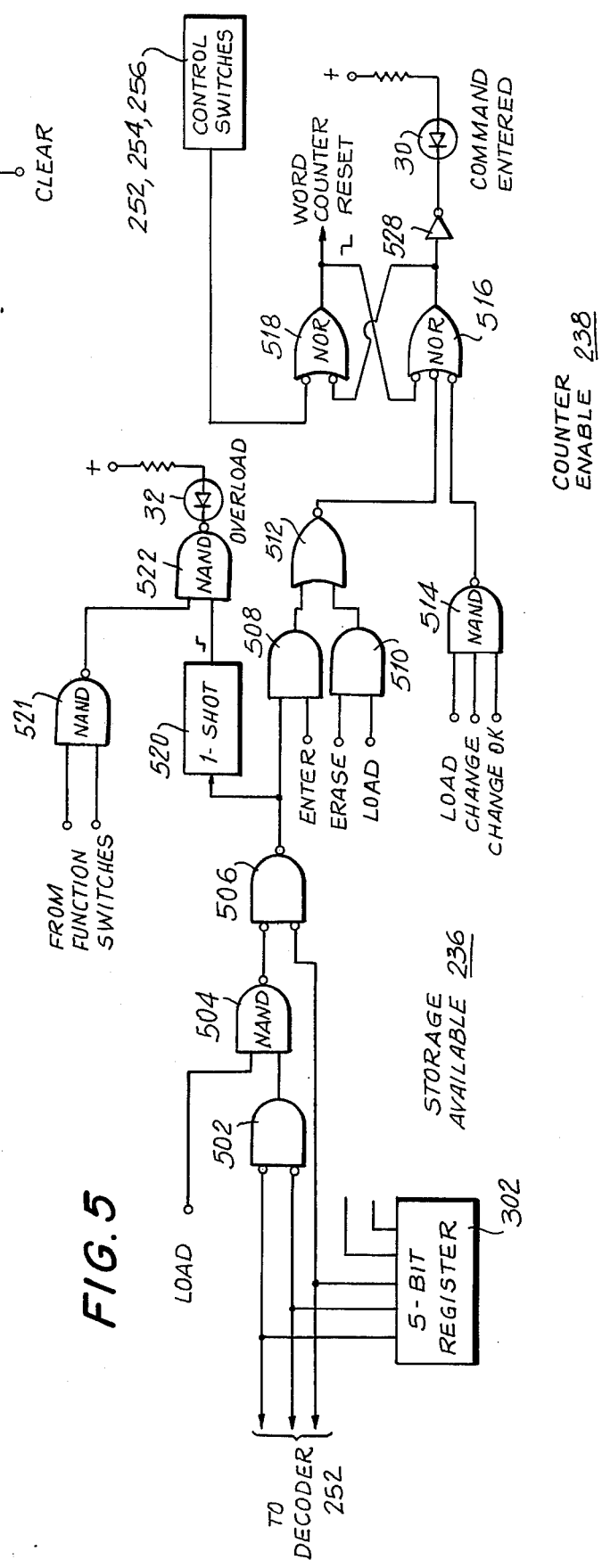

ERASE MODE

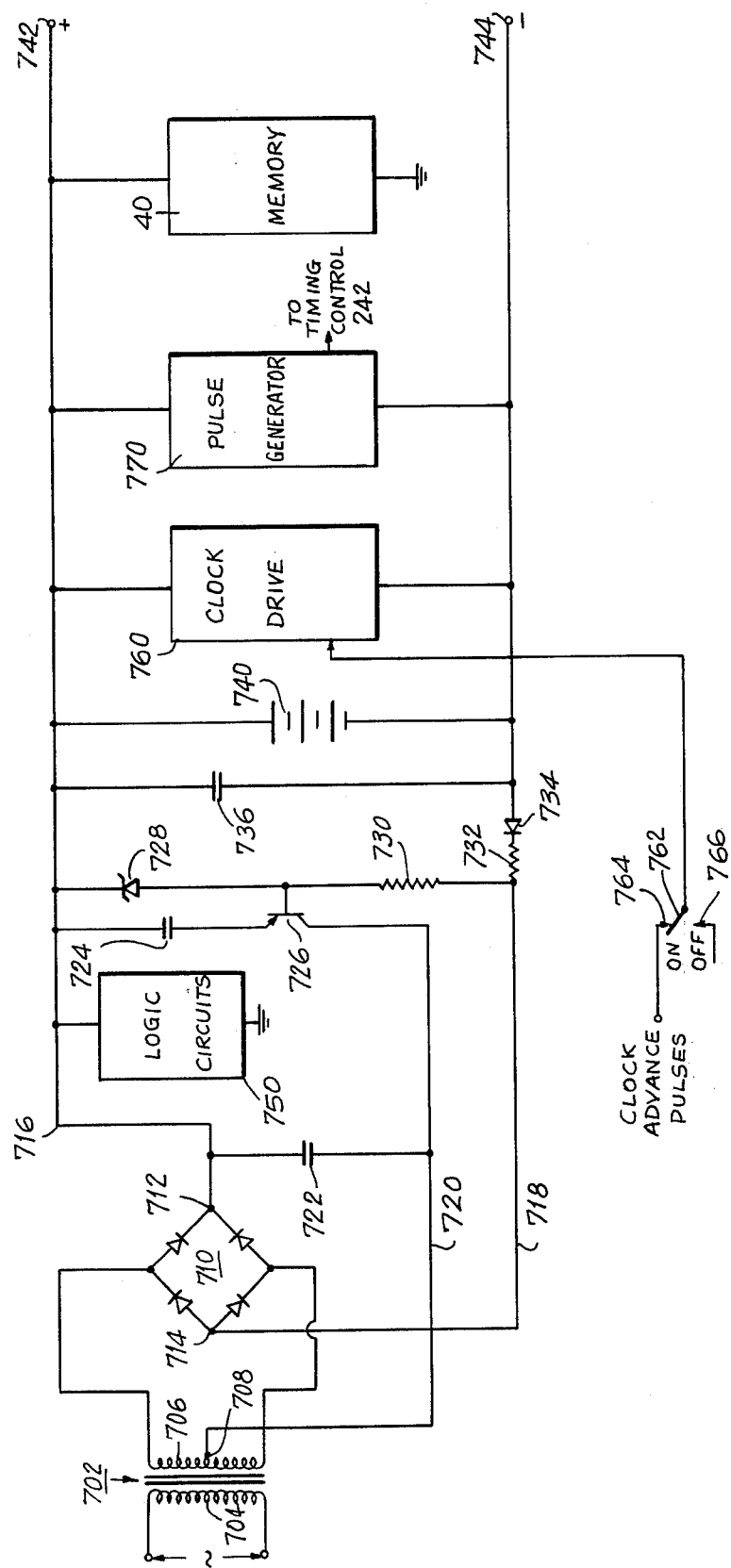

METHOD OF AND APPARATUS FOR CONTROLLING THE PERFORMANCE OF TIMED FUNCTIONS

BACKGROUND OF THE INVENTION

This invention relates to a programmed timing system, and in particular, to a method of and apparatus for controlling the selective performance of a plurality of predetermined functions at preselected times.

There are many applications requiring the performance of particular functions throughout various times of the day. For example, in institutions, such as schools, hospitals or the like, various motors must be turned on and off at different times. Similarly, the operation of heating and air conditioning systems, such as in public buildings, must also be particularly controlled at various times. In school buildings and on campuses, signalling systems, such as bells, to signify the start and end of classes, shift changes, and the like, must be synchronized to operate at preselected times. In other environments, lighting systems, such as parking lot illumination devices, must be turned on at one time and turned off at another time. Locking mechanisms for doors, gates and the like might also be energized and de-energized at particular times.

To accomplish the foregoing functions as well as other timed functions, programmer apparatus has been developed to energize selected output devices at particular times of the day. To obtain uniformity in operation, such programmer apparatus preferably have been driven by or operated in synchronism with a master clock mechanism. Typical prior art programmer apparatus include the drum and pin system. In this system, a drum is driven in synchronism with a master clock. Holes are drilled in the drum at points corresponding to the minutes of the day. Pins are inserted at various points corresponding to preselected minutes at which a function is to be performed. As the drum rotates, the predisposed pins activate various contact figures in timed relation such that the contact figures, in turn, energize associated output devices so that predetermined functions are performed at the preselected times.

In other programmer apparatus, chain systems have been provided to control the times performance of particular functions. In the chain system, a chain rotates through a cycle determined by a master clock mechanism. As the chain rotates, its links are disposed to close various contacts. The closure of the contacts serves to energize particular output devices, whereby the predetermined functions are performed. In still other programmer apparatus, punched tapes are used. The apertures provided in a moving tape permits conducting fingers or bars disposed on opposite sides of the tape to contact each other when a hole or other aperture appears. As in the aforementioned systems, this contact permits an output device to be energized so that a predetermined function is controlled.

These prior art electromechanical systems have been difficult to operate, have been costly to maintain and offer less than perfect results. In particular, a significant disadvantage attending the operation of these devices is the difficulty in programming them. That is, a skilled technician must reconstruct the basic operating elements of the electromechanical systems to alter the function to be performed and the times for performance. For example, in the drum and pin system, the various pins must be removed from the drum and reinserted at other selected locations. In the chain system, the various links must be altered and/or the disposition of the contacts must be rearranged. In the punched tape system, an entirely new tape must be prepared. Such efforts to reprogram these devices are time consuming and often are not easily verified. That is, the desired results might not be easily obtained, and erroneous functions might be performed at improper times.

In an attempt to overcome the inherent disadvantages of such prior art programmer apparatus, a patch-cord system has been proposed. In the patch-cord system, a plurality of gating devices, equal in number to the number of functions to be performed, are provided. Each gating device is adapted to be connected to various colored patch-cords. The patch-cords supply signals to the gating devices representing time, and further supply an output signal from a particular gating device to an output device corresponding to a function to be performed. The timing signals are generated by a master clock. For example, if bells are to be sounded at, for instance, 11:15 a.m., a particular patch-cord is connected from one gating device to an output device that is provided to energize the bells. This one gating device is connected to the master clock by patchcords that are coupled to predetermined clock contacts such that the gating device is actuated when the master clock obtains the time of 11:15 a.m. At that time, the gating device is actuated and an output signal is transmitted from the gating device to the connected output device so that the bells are sounded.

Although the patch-cord system has operated satisfactorily, the myriad of cords required to interconnect the various components of the programmer has made programming extremely complicated. To change a program, that is, to vary the function to be performed or the time at which a function is to be performed, often requires the time consuming operation of disconnecting and reconnecting the various patchcords. A technician must have particular skill to intricately rewire the various interconnecting components. Hence, the patch-cord system offers less than maximum convenience and is not easily programmed by one who lacks particular expertise.

OBJECTS OF THE INVENTION

Therefore, it is an object of the present invention to provide an improved method of and apparatus for controlling the selective performance of a plurality of predetermined functions at preselected times.

It is another object of the present invention to provide improved programmer apparatus including a solid state electronic memory.

A further object of this invention is to provide an improved method of programming the performance of functions, and apparatus therefor that can be readily operated without the requirement of skilled expertise.

Yet another object of the present invention is to provide an improved method of programming the performance of functions, and the apparatus therefor, wherein programmed functions can be readily changed or deleted by a relatively simple operation.

An additional object of this invention is to provide improved programmer apparatus wherein interconnecting patchcords are not needed and the programming of the functions to be performed is attained by the selective operation of manual switches.

A further object of the present invention is to provide improved programmer apparatus constructed of solid state, integrated circuit electronics.

Another object of this invention is to provide improved programmer apparatus that is capable of being operated even in the event of failure of the main power supplied thereto.

Another object of this invention is to provide improved programmer apparatus wherein the performance of programmed functions can be temporarily suspended.

Various objects and advantages of the invention will become clear from the detailed description set forth below, and the novel features will be particularly pointed in the appended claims.

SUMMARY OF THE INVENTION

In accordance with the present invention, a method of and apparatus for controlling the selective performance of a plurality of predetermined functions at preselected times is provided wherein function and time data representing functions to be performed and the times of performance are generated; the generated data is stored; the stored data is compared to time of day data respresenting the actual time of day then obtaining; and a particular function represented by stored function data is performed when the actual time of day corresponds to stored time data. Stored data can be erased or changed to alter the function and/or time of performance of a function.

BRIEF DESCRIPTION OF THE DRAWINGS

The following detailed description of a preferred embodiment of the invention will best be understood by referring to the drawings in which

FIG. 4 is a logic diagram of a comparator circuit that is used in the programmer apparatus;

FIG. 5 is a logic diagram of particular memory control circuits of the programmer apparatus;

FIG. 12 is a partial schematic partial block diagram of the power supply for the programmer apparatus.

DETAILED DESCRIPTION OF A CERTAIN PREFERRED EMBODIMENT

General

Figure 1:
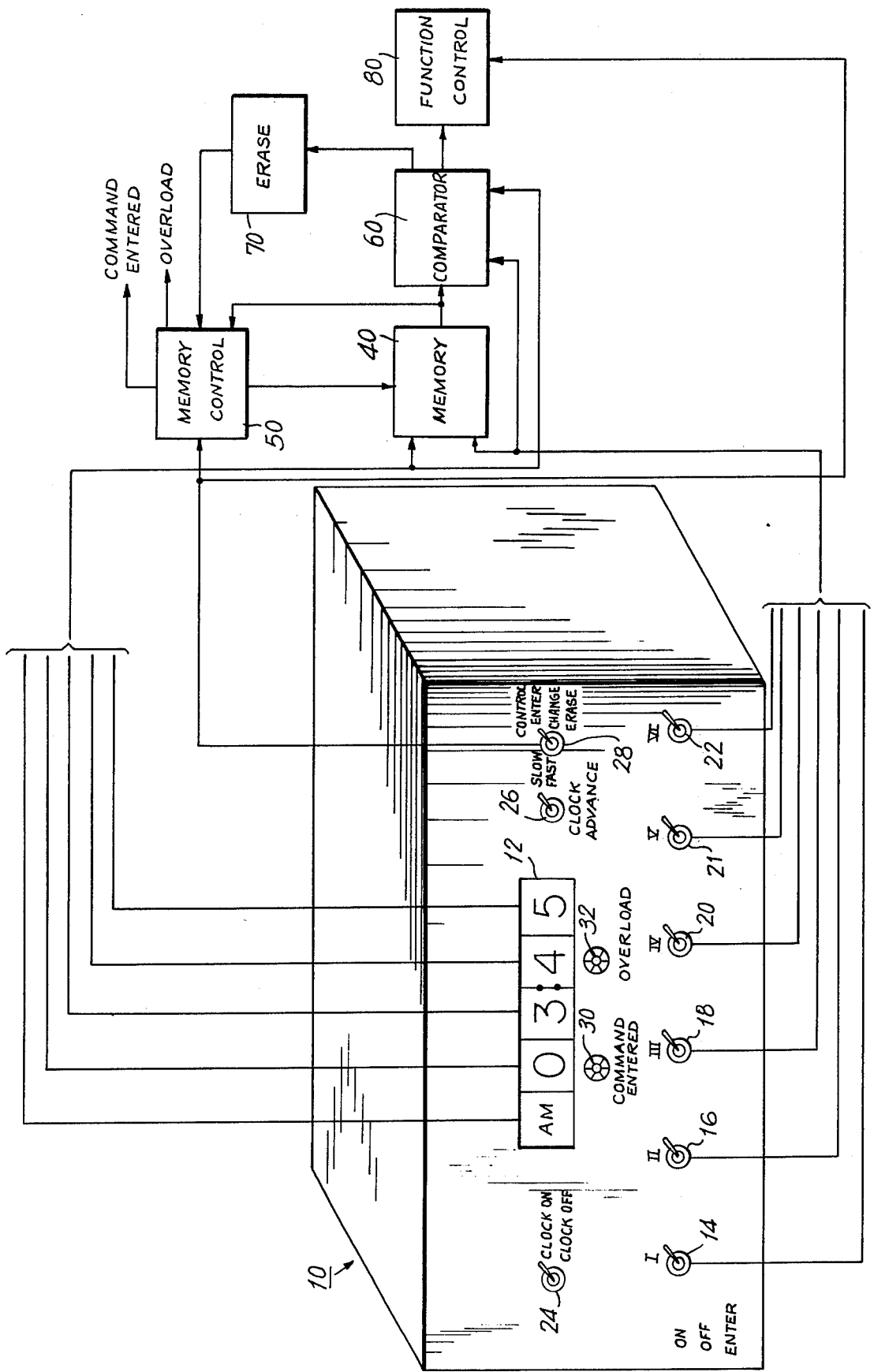
FIG. 1 is a general block diagram of programmer apparatus in accordance with an illustrative embodiment of the present invention.

Referring now to the drawings, wherein like reference numerals are used throughout, and in particular to FIG. 1, there is illustrated programmer apparatus contained in a housing 10. The apparatus is provided with a clock display 12, a plurality of function switches 14, 16, 18, 20, 21 and 22, a plurality of mode selecting switches 24, 26 and 28 and indicating devices 30 and 32. The clock display 12 is here illustrated as a digital clock mechanism comprised of a plurality of indicating drums capable of displaying minutes, tens of minutes, hours and tens of hours. Additionally, an AM/PM display is provided. The clock display is thus capable of providing an indication of time from 0:00 to 12:59, and either AM or PM. In an alternative embodiment, the clock display provides a complete indication of 24 hours from 0:00 to 23:59. In this alternative embodiment, it is appreciated that the AM/PM indicator may be omitted. In a still further alternative embodiment, the clock display comprises a conventional clock face including the usual minute and hour hands. Notwithstanding the particular display embodiment that is used, the clock display provides coded digital data representing the time displayed by the mechanism at suitable electrical terminals. As is appreciated, the time data derived from the mechanism may admit of any desired code and, in a preferred embodiment, is of the conventional BCD code. As will soon be described, the clock display 12 is adapted to be advanced to represent the actual time of day then obtaining. Hence, a master clock or other device capable of providing time advancing pulses is electrically connected to the clock display for suitably driving the display. Such master clock can, of course, be included within the housing 10.

The function switches 14, 16, 18, 20, 21 and 22, only six of which are illustrated, are each associated with a predetermined function. Each switch is preferably comprised of ganged switching devices and is adapted to be manually operated to any one of three conditions. That is, each switch may be set to its "ON" condition, its "OFF" condition and an "ENTER"[condition. As will soon be described, in the ON condition a switch is electrically connected to an energizable device, such as a relay or the like, to permit control signals to be transmitted through the switch to the associated energizable device. When a switch admits of its ON condition, the performance of the function associated with that switch is enabled. Conversely, when a switch admits of its OFF condition, the connection to the energizable device is interrupted. Consequently, control signals that might otherwise be transmitted to the energizable device are blocked.

The function switches 14, 16, 18, 20, 21 and 22 also serve to enable an operator to select those functions that are to be performed at preselected times. These switches thus permit an operator to program the illustrated apparatus. More particularly, when a function switch is operated to its ENTER condition, function data is generated by the operation of such function switch and is transmitted to the controlling circuits of the programmer apparatus, to be described. For example, if the function associated with function switch 14 is to be performed at a preselected time, the function switch 14 is operated to its ENTER condition. Preferably, the function switches are spring loaded so as to admit of the ENTER condition only when specifically operated to that condition.

The mode selecting switches 24, 26 and 28 are manually operable switches adapted to determine the particular mode of operation of the programmer apparatus. In the illustrated device, four distinct modes of operation are provided, viz., a "CONTROL" mode, an ENTER mode, a "CHANGE" mode and an "ERASE" mode. The CONTROL mode controls the performance of a function associated with the function switches 14, 16, 18, 20, 21 and 22 at particular times of the day as displayed by the clock display 12. The specific manner in which the performance of these functions is controlled will be described hereinbelow. In the "ENTER" mode, the particular function data and time data representing a function to be performed and the time at which the function is to be performed are generated and entered into the programmer apparatus. In the CHANGE mode, previously entered function and time data are altered. Thus, a function that was previously performed at a given time is either no longer performed at all or is merely not performed at that time, depending upon the change of data. In the ERASE mode, all of the time and function data that had previously been entered in the programmer apparatus is erased. Thus, no functions are performed after the erasure of all such data. As illustrated, the mode selecting switch 28 is adapted to be manually operable to select one of the CONTROL, ENTER, CHANGE and ERASE modes. As will be described hereinbelow, the switch 28 is preferably a multi-level switch having plural, individual contacts.

In one embodiment the switch 28 is operated by an operator in conjunction with switch 24. The latter switch exhibits two operating states, viz, a "CLOCK ON" and a "CLOCK OFF" state. In the CLOCK ON state, the digital clock mechanism is driven by a master clock or equivalent device and is thus supplied with periodic drive pulses to advance the indication of time displayed thereby. Hence, in the CLOCK ON state, the clock display 12 provides a conventional clock display to represent the actual time of day. However, when switch 24 is operated to its CLOCK OFF state, the drive pulses previously supplied to the clock display 12 are interrupted. Hence, the clock display no longer shows the time of day but may now be manually set to any desired time display. In an alternative embodiment the switch 24 is omitted and the CLOCK ON function is performed only when the mode selecting switch selects the CONTROL mode.

The switch 26 admits of two operating states, viz. "SLOW" and "FAST". This switch, designated the CLOCK ADVANCE switch permits an operator to set the clock display 12 to any desired time display when the digital clock mechanism is not supplied with driving pulses. The two states of the CLOCK ADVANCE switch 26 enable the display 12 to be rapidly yet precisely advanced at a preselected time display.

Also included in the housing 10 are the indicating devices 30 and 32. These devices are adapted to provide visual indications of selected conditions of the programmer apparatus and are preferably comprised of light emitting diodes. In an alternative embodiment, the display devices are comprised of conventional lamps, such as incandescent lamps. In particular, the display device 30 is a COMMAND ENTERED display device that is capable of apprising an operator that the programmer apparatus has been properly programmed so that a predetermined function will be performed at a preselected time. The display device 30 is also capable of apprising an operator that a function that had previously been programmed into the programmer apparatus has been deleted therefrom. The OVERLOAD display device 32 is capable of apprising an operator that the programmer apparatus has been programmed to its capacity and that such apparatus is no longer capable of receiving additional function and time data so as to control the performance of a further function.

The programmer apparatus is comprised of particular circuits that are responsive to the selective operation of the function and mode selecting switches as well as the digital signals provided by the clock display to thereby control the performance of the predetermined functions. These circuits may be broadly identified in accordance with general operations of such circuits. In particular, the programmer apparatus includes a memory device 40, a memory control circuit 50, a comparator circuit 60, an erase circuit 70, and a function control circuit 80.

The memory 40 is an electronic memory that is capable of storing the function and time data representative of the predetermined functions to be performed and the preselected times of performance. The memory 40 by itself is conventional and includes a plurality of storage locations where the functions and time data are stored. As is appreciated, the function data to be entered into the memory is produced by the selective operation of the function switches 14, 16, 18, 20, 21 and 22. The time data to be entered into the memory is derived from the outputs of the clock display 12. Data is selectively written into the memory device 40 under the control of the memory control circuit 50. The memory device 40 is coupled to the comparator circuit 60 and the memory control circuit 40 for a purpose to be described. The memory control circuit 50 is adapted to permit time and function data to be entered into the memory device, to delete predetermined function data from the memory and to erase the entire contents stored in the memory. The particular mode of operation of the memory control circuit is determined by the mode selecting switch 28. Accordingly, when function and time data are to be entered into the memory device 40, the appropriate operation of the switch 28 permits the memory control circuit 50 to determine the availability of a storage location in the memory wherein the time and function data may be stored. The memory control circuit includes a sensing circuit for sensing the availability of a storage location to store data.

If a CHANGE mode of operation is selected, the memory control circuit 50 is adapted to identify the particular storage location in the memory device 40 in which the function and time data to be changed is stored. For this mode of operation, the memory control circuit 50 operates with the comparator circuit 60 and the erase circuit 70, as will be described. Upon identifying the particular storage location from which the stored data is to be deleted, the memory control circuit effectively erases such contents from the identified storage location.

When the entire contents of the memory device 40 are to be erased, the memory control circuit 50 deletes the stored data from each memory storage location. This ERASE mode can be selected by the appropriate operation of switch 28 or alternatively, an independent ERASE switch (not shown) can be provided.

The comparator circuit 60 is coupled to the memory device 40 and, additionally, is adapted to receive the time data derived from the clock display 12 and the function data produced by the operation of the function switches 14, 16, 18, 20, 21 and 22. The comparator circuit compares the produced time and function data with the time and function data stored in the memory device. In a preferred embodiment of the present invention, the comparator circuit 60 is a digital comparator that is adapted to compare, on a bit-by-bit basis, the stored data and the produced data. As illustrated in FIG. 1, the comparator circuit is coupled to the erase circuit 70 and the function control circuit 80.

The erase circuit 70, described in detail hereinbelow, is adapted to be enabled by the selection of the ERASE mode by the selecting switch 28, to permit the memory control circuit 50 to identify the particular location in the memory device 40 in which the data to be deleted is stored. To this effect, the erase circuit is capable of responding to a favorable comparison obtained from the comparator circuit 60. That is, the favorable comparison represents that a particular storage location has been found wherein the stored data fully corresponds to the particular time and function data that is to be deleted.

When a CONTROL mode of operation is selected by the mode selecting switches 24, 26 and 28, the function control circuit 80 is enabled to permit a predetermined function to be performed at a preselected time. The function control circuit 80 is comprised of a plurality of output control circuits, each being associated with a respective function represented by the function switches 14–22. The function control circuit 80 further includes a circuit adapted to receive function data that is read out from the memory device 40 through the comparator circuit 60. The received function data is representative of a function to be performed. Hence, the function control circuit includes a decoder for supplying an output control signal to one of the output control circuits corresponding to the function data received by the function control circuits. It is recalled that each of the output control circuits includes an energizable device that is actuated in response to a control signal supplied thereto. Furthermore, each output control device includes an associated function switch that is adapted to prevent a control signal from actuating the energizable device when the function control switch is positioned at its OFF condition. The function control circuit 80 is adapted to respond to the output of the comparator circuit 60 when the programmer is disposed in its CONTROL mode of operation.

The general operation of the illustrated programmer apparatus will now be described. Let it initially be assumed that some storage locations in the memory device 40 include time and function data, while other storage locations are available for storing such data. Let it be further assumed that at a particular time, such as 3:45 a.m., a particular motor, such as a heat generating motor, is to be turned on. It additionally will be assumed that such motor is associated with function IV provided by the function switch 20. To enter this command that function IV be performed at 3:45 a.m., the switch 28 is positioned at its ENTER position and, in the illustrated embodiment, the switch 28 is positioned at its CLOCK OFF condition. The switch 26 is operated to advance the time displayed by the clock display 12 so that the time 3:45 a.m. is indicated. The function switch 20 is then operated to its ENTER condition so that function and time data representing that function IV is to be performed at 3:45 a.m. is supplied to the memory device 40.

Since the mode selecting switch 28 has been operated to select the ENTER mode, the memory control circuit 50 is now activated to determine whether the memory device 40 includes a storage location that is available to store the function and time data supplied by the clock display 12 and the function switch 20. When such available storage location in the memory device has been sensed, the memory control circuit enables the function and time data to be entered into that location. In addition, the memory control circuit 50 produces an output COMMAND ENTERED signal which is supplied to COMMAND ENTERED indicating device 30. The operator is thus apprised of the entrance of the command into the memory device. Once this data has been so entered, the memory control circuit 50 prevents further data from being entered into the memory device unless another enter command is provided.

If, now, another function, such as function II, is to be performed at 3:45 a.m., an operator will operate the function switch 16 to its ENTER condition. Memory control circuit 50 will again sense whether a storage location in the memory device is available for storing the newly presented function and time data. When such available storage location is sensed, the memory control circuit 50 enables the function and time data, representing the function II to be performed at 3:45 a.m., to be entered into the sensed storage location. As before, the COMMAND ENTERED indicating device 30 is energized.

Additional function and time data may be entered into the memory device 40 in a similar manner merely by operating the CLOCK ADVANCE switch 26 to advance the clock display 12 to a preselected time and by operating the appropriate function switch to select the desired function to be performed. Thus, individual data entries are made until all of the functions desired by an operator have been entered, or until the memory device 40 has reached its full capacity. If the memory device has been fully loaded so that no storage location is available to store new function and time data, and if additional data is attempted to be stored, the memory control 50 produces an OVERLOAD signal. This signal is supplied to the OVERLOAD indicating device 32 to apprise the operator that the memory device has attained its full capacity. The operator thus recognizes that no further entries of data can be made.

Let it now be assumed that, once the apparatus has been appropriately programmed with function and time data, that is, once the operator has entered into the memory device 40 data representing the desired functions to be performed at the time of performance of such functions, the programmer apparatus is conditioned in its CONTROL mode of operation. The mode selecting switch 24 is thus actuated to its CLOCK ON condition and the clock display 12 is supplied with suitable driving pulses so as to be advanced to indicate the actual time of day. The produced time data, now regularly incremented by the clock display and representative of the actual time of day is supplied to the comparator circuit 60. During each unit of time, e.g., each minute, all of the data stored in the memory device 40 is compared to the time data by the comparator circuit. In a preferred embodiment, the contents of each storage location are individually compared to the time data. If a stored command represents that a function is to be performed at a time that is identical to the actual time of day then obtaining, the comparator circuit 60 will indicate a favorable comparison. That is, the time data that is stored in at least one location of the memory device will be identical to the instantaneous time data derived from the clock display 12. This identity will be detected by the comparator circuit and ana output signal will be supplied to the function control circuit 80 to intitiate the performance of the proper function.

More particularly, during a CONTROL mode, when the comparator circuit 60 detects a favorable comparison between stored time data and the instantaneous time data, the stored function data that is associated with that stored time data is supplied by the comparator circuit to the function control circuit 80. It is recalled that this function data had been produced by the actuation of one of the function switches 14–22. Consequently the function data, which is a coded representation of the function that had been selected to be performed, is decoded in the function control circuit to produce a function actuating signal. This signal activates a corresponding output control circuit whereby a control signal is applied to a corresponding energizable device. Consequently, the energizable device is energized and the function is performed. For example, if the energizable device comprises a relay, the control signal generated in response to the decoded function data is applied to the relay coil to correspondingly actuate the relay contacts. The function adapted to be performed in response to such relay contact actuation is now performed.

It is recalled that an associated function switch is connected between the output control circuit and the energizable device. Hence, in the aforedescribed example wherein the energizable device is comprised of a relay, the relay coil will be energized by the control signal if the function switch is disposed in its ON condition. However, if the performance of that function is to be suspended, the function switch will be disposed in its OFF condition to thereby prevent the relay coil from being energized.

Although the foregoing general discussion has assumed that the function data stored in the memory device 40 and supplied by the comparator circuit 60 to the function control circuit 80 is a coded representation of a function to be performed, i.e., is a coded representation of the particular energizable device that is to be energized, it is appreciated that any form of coding that finds ready application in digital techniques can be used.

It may be appreciated that, since the mode selecting switch 28 has selected the CONTROL mode of operation, the memory control circuit 50 is rendered inoperative to enter the time data that is now generated by the clock display 12 into the memory device 40. Similarly, although various storage locations in the memory device might now be available to store function and time data, the memory control circuit is not operably responsive to the presence of such available storage locations because the mode selecting switch 28 is here not in the ENTER condition. Consequently, when in the CONTROL mode of operation, the programmer apparatus is not capable of programming the memory device so as to store new commands therein.

Let it now be assumed that an operator desires to change a previously programmed function, that is, a function that had previously been performed at a given time is no longer to be performed. Alternatively, that function is still to be performed, but at a different time. In either event, to change the performance of such programmed function, it is necessary to erase the previously stored command concerning such function from the memory device.

To delete a stored command from the memory device 40, that command must first be identified. Accordingly, the mode selecting switch 28 is disposed at its CHANGE condition so as to prepare the memory control circuit for a command change operation. The function and time data to be erased from the memory device is recreated by suitably operating the clock display 12 and the particular function switch. To this effect, the mode selecting switch 24 is disposed in its CLOCK OFF position to render the clock display nonresponsive to driving pulses supplied by the master timing device. The CLOCK ADVANCE switch 26 may now be operated in the aforedescribed manner to advance the clock display to the particular time associated with the previously stored command now to be deleted. Once the clock display has been advanced to indicate the desired time, the particular function switch associated with the function of the command to be deleted is operated to its ENTER condition. It is recognized that up to this point, the operation necessary to effect a change in command is substantially identical to the previously described COMMAND ENTER operation. However, the function and time data produced by the actuated function switch and the clock display 12 are now supplied to the comparator circuit 60. Since the mode selecting switch 28 is not in its ENTER condition, the memory control circuit 50 is not capable of entering this data into the memory device 40. However, the comparator circuit operates to compare this data to all of the function and time data that is stored in the memory device. When the comparator circuit detects a command that is identical to the function and time data produced by the function switch and clock display, that is, the command to be erased, the erase circuit 70 is actuated to identify the particular storage location in the memory device in which such command is stored. The memory control circuit 50, once apprised of the particular storage location to be erased, operates to effectively erase the command that had been stored in such storage location. Consequently, the function associated with that command will no longer be performed at the particular time previously selected for the performance of such function. Of course, if other commands stored in the memory device represent that this function is to be performed at other times, such commands are not affected and the performance of the function at such other times will be enabled.

It is appreciated that, by erasing a command from the memory device 40, the particular storage location in which the erased command had been stored is now available for the storage of a new command. Thus, if an operator desires, such new command may now be entered by operating the programmer apparatus in the aforedescribed ENTER mode. That is, the mode selecting switch 28 is disposed in its ENTER condition, the clock display 12 is advanced to a desired time display and the appropriate function switch associated with the function desired to be performed is actuated to its ENTER condition. The memory control circuit 50 will then enter the new function and time data into the memory device 40.

Let it now be assumed that the entire contents of the memory device are to be erased. That is, each command previously stored is to be deleted. To achieve this operation, the operator actuates the mode selecting switch 28 to its ERASE position. A corresponding control signal is thus applied to the memory control circuit 50 whereby the memory control circuit renders the memory device 40 nonresponsive to the function and time data supplied by the function switches and clock display 12. Thus, the clock display may be operated in its normal CLOCK ON mode so as to be advanced by driving pulses to thus display the actual time of day. Furthermore, when operating in the ERASE mode, the comparator circuit 60 is unable to compare the function and time data supplied by the function switches and the clock display to the function and time data stored in the memory device. Finally, the memory control circuit 50 operates to delete the contents of each storage location in the memory device. Consequently, the memory device is cleared of previously stored commands and is now adapted to be completely reprogrammed.

DESCRIPTION OF A PARTICULAR SYSTEM

Figure 2:
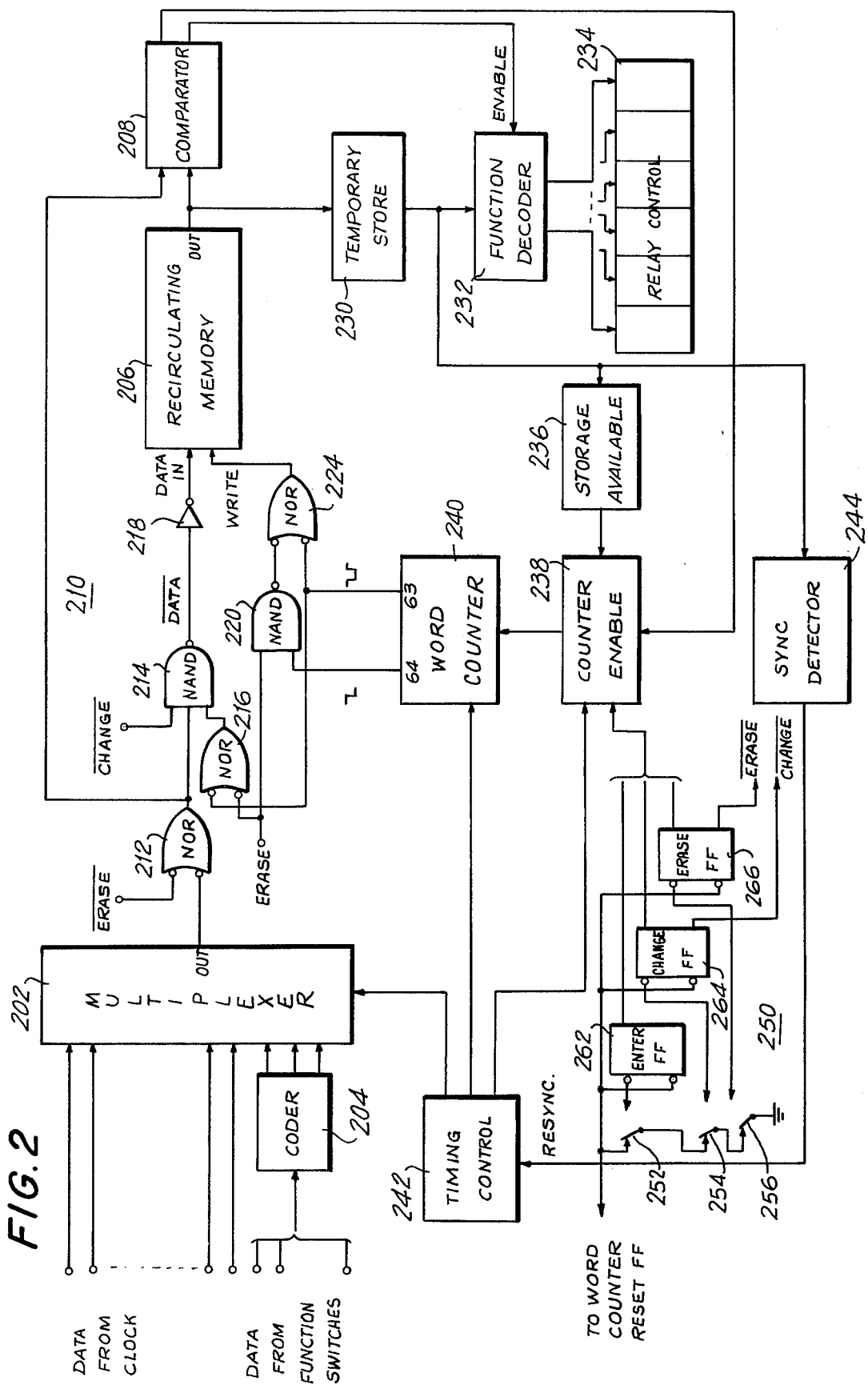
FIG. 2 is a system block diagram of the programmer apparatus.

Referring now to FIG. 2, there is illustrated a block diagram of the system. A specific embodiment of the memory device, memory control circuit, comparator circuit, erase circuit and function control circuit of FIG. 1 is represented. The illustrated system is comprised of a recirculatory memory 206, a serial comparator 208, a temporary storage circuit 230, a function decoder 232, an available storage location detector 236, a counter enable circuit 238, a word counter 240 and a timing control circuit 242. Although a conventional static memory device such as a core memory, a shift register matrix memory, or the like, exhibiting predetermined or random access features, can be used with the present invention, the preferred embodiment employs the recirculating memory 206. The recirculating memory is a conventional multi-bit recirculating dynamic shift register of a type that is commercially available, such as Signetics Model 2512 manufactured by Signetics Corporation, Sunnyvale, California. The recirculating memory is adapted to be supplied with timing pulses, not shown, to advance the bits stored in the dynamic shift register through each sequential stage of that register. The bits are thus successively advanced from an initial stage to an output stage and then fed back to the initial stage, thereby forming a recirculating data stream. As long as timing pulses are continually supplied to the recirculating memory, the contents thereof continually recirculates. As each bit is advanced to the output stage, it may be supplied to further apparatus and used for various operations. The bit from the output stage is, of course, fed back to the input stage as part of the recirculating data stream. The recirculating memory 206 includes a WRITE input terminal coupled to the input stage and a DATA IN terminal coupled to that input stage. The purpose of these input terminals is to permit a bit supplied to the DATA IN terminal to be stored in the input stage of the recirculating memory when an appropriate WRITE pulse is applied to the WRITE input terminal. This written in bit is then included as part of the recirculating data stream.

Although dynamic recirculating shift registers having any data bit capacity can be used, in a specific embodiment of the present invention, the recirculating memory 206 includes a capacity of 1024 data bits. As will soon be described, data that is recirculated in the recirculating memory 206 is arranged in the form of data words, each word being comprised of a plurality of bits. In the specific embodiment described, each data word is comprised of 16 bits. Hence, the recirculating memory 206 is adapted to store 64 words. It is apparent that, with a storage capacity of 64 words, the recirculating memory 206 effectively includes 64 storage locations, each of which being recirculated. Of course, the recirculating memory can have any desired storage capacity, and the example of 64 words, each comprised of 16 bits, is merely illustrative and is not intended to limit the scope of the present invention.

The DATA IN terminal of the recirculating memory 206 is adapted to receive various data signals supplied thereto by a gating network 210. As will soon be described, the data signals supplied by the gating network comprise function and time data derived from the function switches and clock display previously described with respect to FIG. 1, a predetermined coded data for effectively erasing the contents of a storage location and a synchronization word. The manner in which these data signals are generated and supplied will be described hereinbelow. As illustrated, the gating network 210 also provides the WRITE signal to the recirculating memory 206 to thereby permit supplied data signals to be stored.

The output stage of the recirculating memory 206 is coupled to the comparator circuit 208 and to the temporary storage circuit 230. Accordingly, the comparator circuit is adapted to serially receive the data words that are recirculated through the recirculating memory. The comparator circuit 208 is also coupled to the gating network 210 to receive function and time data that are generated by the function switches and clock display of FIG. 1. The comparator circuit 208 serves to compare the serially supplied data words from the recirculating memory 206 with the function and time data supplied by the gating network 210. The comparator circuit may thus be formed of conventional logic gates well known to one of ordinary skill in the art. As one example, the comparator circuit includes a shift register adapted to receive the data words serially supplied from the recirculating memory 206 and a further shift register for receiving the function and time data supplied by the gating network 210. These two shift registers are connected to a plurality of coincidence gates whereby a bit-by-bit comparison of the contents of the shift registers is effected. If the data word received from the recirculating memory is identical to the function and time data received from the gating network, a favorable comparison is provided. In a preferred embodiment of the comparator circuit 208, a relatively simple gating circuit is serially supplied with the bits of the data word from the recirculating memory 206 and the bits formed of the function and time data from the gating network 210. Hence, a dynamic bit-by-bit comparison is effected. Depending upon the operational mode of the programmer apparatus, a favorable comparison is provided by the comparator circuit 208 which in turn supplies an "ENABLE" signal to a function decoder 232 and/or an ENABLE signal to the counter enable circuit 238.

The temporary storage circuit 230 is comprised of a shift register having a capacity that is less than the total number of bits comprising a data word. Hence, the temporary storage circuit is adapted to store at least a portion of each data word that is recirculated by the recirculating memory 206. Of course, as the recirculating data stream advances through the recirculating memory 206, the contents of the temporary storage circuit 230 are continually incremented. Accordingly, the temporary storage circuit 230 is provided with timing pulses, not shown. As will be described below in one embodiment of the present invention the temporary storage circuit stores, for example, the last five bits shifted out of the recirculating memory 206. In this embodiment the temporary storage circuit comprises the last five stages of the memory 206, but in other embodiments it can comprise a storage register connected in parallel with the last five stages in the memory. The output of the temporary storage circuit is coupled to the function decoder circuit 232, the available storage location detector 236 and the synchronization detector 244. Preferably, the outputs of various ones of the stages of the shift register included in the temporary storage circuit are coupled in parallel to the illustrated circuits so that the contents of the temporary storage circuit can be readily examined and identified.

The function decoder circuit 232 is a conventional decoding device adapted to provide output signals in accordance with the particular combination of data bits supplied thereto. The function decoder circuit 232 includes an ENABLE input terminal that is coupled to the comparator circuit 208 to enable the operation thereof. In particular, a signal supplied to the ENABLE input terminal of the function decoder circuit serves to permit the operation of the decoder circuit. Typical examples of such a decoder circuit include a diode matrix, a gating matrix and the like. Each output terminal of the function decoder circuit is connected to an individual relay control device 234. Output signals provided by the function decoder circuit act as control signals for the corresponding relay control devices. Consequently, if each relay control device includes an energizable relay, a control signal supplied thereto by the function decoder circuit 232 serves to energize that relay. Further description of the relay control device 234 and its cooperation with the function decoder circuit 232 is provided below with respect to FIG. 6.

The available storage location detector 236 is comprised of gating circuits and is adapted to detect when predetermined bits are stored in the temporary storage circuit 230. As will soon be described, the presence of these predetermined bits indicates the availability of a storage location in the recirculating memory 206. That is, the available storage location detector is adapted to produce an output signal when the number of data words stored in the recirculating memory is less than the total memory capacity. This output signal is produced when an available storage location in the recirculating data stream has been advanced to a predetermined position.

The synchronization detector 244 is similar to the available storage location detector 236 and serves to produce a "RESYNC" output signal when predetermined data bits are stored in the temporary storage circuit 230. The presence of these predetermined data bits, as detected by the synchronization detector, represents the presence of a synchronization word at a particular location in the recirculating data stream in the recirculating memory. The output of the synchronization detector is coupled to the timing control circuit 242. This timing control circuit is responsive to the RESYNC output signal for resetting the various timing devices included in the timing control circuit to a predetermined state. These timing devices then operate in response to a master clock pulse to produce the various timing pulses, to be described. As is apparent, the synchronization detector 244 is adapted to synchronize the operation of the timing control circuit 242 with the recirculating data stream that is advanced through the recirculating memory 206. Hence, the operation of the various circuits illustrated in FIG. 2 is synchronized.

An output of the timing control circuit 242 is connected to the counter enable circuit 238 to energize the latter circuit at appropriate times. The counter enable circuit includes an output coupled to the word counter 240 to enable the word counter to track the data words included in the recirculating data stream in the recirculating memory 206. A word counter enable signal is produced by the counter enable circuit 238 in response to various input signals supplied thereto. As illustrated, the counter enable circuit is connected to the available storage location detector 236, to the comparator 208 and to a mode control circuit 250. Depending upon the various signals applied to the counter enable circuit by the mode control circuit 250, the counter enable circuit is adapted to produce a word counter ENABLE signal in response to various combinations of the remaining input signals that are applied. Accordingly, the counter enable circuit 238 is comprised of a plurality of gating circuits and, preferably, includes a bistable circuit.

The mode control circuit 250 is adapted to produce various mode control signals in accordance with the operational mode of the programmer apparatus as determined by the operation of the mode selecting switch 28 of FIG. 1. Accordingly, the mode control circuit is comprised of a chain of switches 252, 254 and 256, all connected in series to a source of reference potential. Although not illustrated, it should be appreciated that the switches 252, 254 and 256 are mechanically connected to and thus operated by the mode selecting switch 28. In an alternative embodiment, the switch 256 is mechanically connected to an independent ERASE switch. In particular, the switch 252 is adapted to be switched from its normal position, as illustrated, to an operated position when the mode selecting switch 28 is operated to its ENTER condition. As so operated, it is apparent that the switch 252 is capable of supplying the reference potential to a first input terminal of a bistable device 262. The bistable device is preferably a conventional bistable multivibrator, such as a flip-flop, capable of exhibiting two stable output states. The flip-flop circuit includes first and second input terminals and first and second output terminals. As is understood, when a reference potential is applied to a first input terminal, the flip-flop circuit is set and a corresponding output is produced at the first output terminal. Conversely, when a reference potential is applied to the second input terminal of the flip-flop circuit, the flip-flop circuit is reset and a corresponding output signal is produced at the second output terminal. Preferably, the illustrated flip-flop circuit 262 is responsive to reference signals that are mutually exclusively applied to the input terminals. The flip-flop circuit 262 is here designated the ENTER flip-flop.

Switch 254 is similar to the switch 252 and is adapted to be switched to its operating condition when the mode selecting switch 28 is disposed in its CHANGE condition. When so operated, the switch 254 supplies the reference potential to a first input terminal of a bistable device 264. The bistable device is substantially similar to the aforedescribed flip-flop circuit 262 and is here designated the CHANGE flip-flop.

The switch 256 is adapted to be switched to its operating position when the mode selecting switch 28 is disposed in its ERASE condition. When so operated, the switch 256 supplies a reference potential to a first input terminal of a bistable device 266. This bistable device is substantially similar to the aforedescribed flip-flop circuit 262 and is here designated the ERASE flip-flop. As indicated, the second input terminals of each of the ENTER flip-flop 262, the CHANGE flip-flop 264, the ERASE flip-flop 266 are connected in common to the normally closed contact of the switch 252. Hence, when the mode selecting switch 28 is normally positioned in its CONTROL condition, the switches 252–256 exhibit their normally closed states so that the reference potential is applied to the second iput terminals of each of the flip-flops 262–266. This reference potential is normally supplied to a further device described in detail with respect to FIG. 3.

The first output terminal of each of the flip-flops 262–266 is connected to a corresponding input of the counter enable circuit 238. Hence, depending upon the operation of the respective switches 252–256, a corresponding output signal is supplied to the counter enable circuit by an energized flip-flop circuit. To facilitate a ready understanding of the apparatus illustrated in FIG. 2, the respective output signals produced at the first output terminals of the illustrated flip-flop circuits are designated the ENTER signal, the CHANGE signal and the ERASE signal. When these flip-flop circuits are normally de-energized, that is, when the switches 252–256 admit of their illustrated positions, the reference potential normally applied to the second input terminals of each of the flip-flop circuits results in output signals produced at the respective output terminals of these flip-flop circuits, these output signals being designated the $\overline{\text{ENTER}}$ signal, the $\overline{\text{CHANGE}}$ signal and the $\overline{\text{ERASE}}$ signal.

The word counter 240 is comprised of a conventional binary counting circuit and is adapted to track a preselected word location in the recirculating memory 206 as such word location recirculates in the data stream. The word counter is connected to the timing control circuit 242 and is adapted to receive a timing pulse that is synchronized with the data word advance through the recirculating memory. That is, a timing pulse is supplied to the word counter 240 when the last data bit of a data word is shifted through the output stage of the recirculating memory. Accordingly, the word counter is adapted to increment the count thereof in synchronism with the shifting of a data word from the output stage to the input stage of the recirculating memory. The binary counting circuit included in the word counter 240 includes a control terminal that acts to selectively render the word counter inoperative in response to input timing pulses. This control terminal is connected to the counter enable circuit 238. It may be appreciated that when the counter enable circuit produces an enable output signal, the control terminal of the word counter 240 is supplied with an appropriate control signal to permit the word counter to initiate a counting operation in response to each timing pulse generated by the timing control circuit 242.

The binary counting circuit included in the word counter 240 is adapted to count from an initially preset count to a pre-established count. When the pre-established count is attained, the counting operation is terminated and the binary counting circuit is preset to its initial count. Hence, when the pre-established count is reached, the word counter 240 is prepared for reuse. In accordance with the preferred embodiment of the illustrated apparatus, the pre-established count to which the word counter can be incremented is equal to the total word capacity of the recirculating memory 206. In the numerical example described hereinabove, the recirculating memory is assumed to have a capacity of 64 data words. Accordingly, the word counter 240 is adapted to count from an initial preset count of, for example, 0 to a maximum pre-established count of 64. It is apparent that the time required for the word counter 240 to complete a counting operation is equal to the time required for a particular data word to be completely recirculated through the data stream in the recirculating memory 206. When the pre-established count is reached, the word counter 240 is adapted to produce an output signal indicative of that count. Additionally, the word counter includes a gating circuit adapted to detect when the count attained by the word counter is one less than the pre-established count. In accordance with the aforesaid numerical example, the word counter 240 is thus adapted to produce a first output signal when the count 63 has been attained and a second output signal when the count 64 has been reached.

Since the recirculating memory 206 is a serial storage device, it is preferable to supply the function and time data produced by the function switches and the clock display 12 of FIG. 1 in a serial format. It is further preferred to arrange the function and time data in the form of a data word having a first portion comprised of the time data and a second portion comprised of the function data. The serializing of the received data and the formation of the preferred data word is achieved by the multiplexing circuit 202. The multiplexing circuit is conventional and is adapted to convert data bits applied thereto in parallel to a serial output format. The multiplexing circuit 202 is thus provided with a plurality of input terminals coupled to the clock display 12 and to the function switches 14–22. A timing control input is connected to the timing control circuit 242 so that the output serial format is clocked out of the multiplexing circuit in the properly timed sequence. In accordance with conventional digital clock mechanisms, the multiplexing circuit 202 is supplied with four data bits representing the minute data, three data bits representing the tens of minutes data, four data bits representing the hours data and one data bit representing AM or PM. In accordance with the illustrated embodiment, twelve data bits are provided to represent the time data. Since a data word is typically comprised of sixteen bits, it is apparent that the remaining four data bits of such data word may be reserved for function data. If the programmer apparatus is adapted to control the performance of only four distinct functions, it is appreciated that the presence of a function data bit at one of the four reserved locations in the data word will represent the particular function to be performed. Alternatively, if binary coding techniques are employed, the reserved four function data bits can be used to represent $2^4-1$ or 15 distinct functions. It is thus recognized that, depending upon the size of each data word, the number of functions that can be controlled can be either increased or decreased. In the preferred embodiment of the present invention, it is advantageous to use only three of the reserved function data bits to represent function data and to use the fourth bit to separate the successive data words. It should be noted, however, that this convention is merely preferred. The present invention is, of course, fully operable with more or less data bits and with or without data word separation. Thus, each data word format is comprised of twelve time bits followed by three function bits and a space, or word separation, bit. Preferably, the function bits are the last three bits of the data word.

It should also be noted that, in the preferred embodiment, each data word represents but a single function to be performed at a given time. Nevertheless, it is recognized that if more function bits are provided, a data word may represent one, two, or more functions to be performed at the same time. For example, if six functions are to be controlled, the use of eight function bits will simultaneously represent any number of functions, up to all six.

Accordingly, to represent the six functions that have been typically described above in connection with the specific numerical examples, three function bits are provided. A coding circuit 204 is responsive to the individual function data produced by the function switches to generate a three-bit code representing the particular function selected. Those of ordinary skill in the art will recognize that the coding circuit 204 and the decoding circuit 232 are complementary. The coding circuit may generate a conventional BCD code representing the selected function. Similarly, the decoding circuit 232 may produce a single output signal at a corresponding output terminal in response to the BCD code applied thereto.

Although a multiplexing circuit 202 has been provided to convert the time data and the function data (supplied in coded configuration) into a serial format arranged as a data word, it is appreciated that the multiplexing circuit may be replaced by a conventional parallel-to-serial converter. Nevertheless, the serialized function and time data is coupled to the recirculating memory 206 and to the comparator 208 by the gating circuit 210. The gating circuit 210 is comprised of a plurality of logic coincidence gates, and in particular, a plurality of NAND/NOR circuits. Those of ordinary skill in the logic circuitry art will recognize that the logic functions performed by a NAND gate, for example, are identical to the logic functions performed by a NOR gate. Thus, for all practical purposes, NAND and NOR gates are interchangeable. However, to best appreciate the particular logic function intended to be performed by each gate, the notation NAND or NOR is used to best designate that function.

Essentially, a NAND gate is adapted to perform a coincidence detecting function, such as that performed by a logic AND gate, but additionally includes an inverting output terminal. That is, in the operation of a NAND gate, if each input terminal is supplied with a given signal, the output will be the inverse of such given signal. Conversely, if any one input of a NAND gate is not provided with such a signal, the output produced by that NAND gate is equal to that given signal. For the purpose of explanation, it will be assumed that if the input signal applied to each of the input terminals of a NAND gate admits of a relatively high level (hereinafter a "high") the output produced by the NAND gate will admit of a relatively low level (hereinafter a "low"). Of course, if desired, the NAND gate can be constructed such that an opposite function is attained. The high and low signal levels are generally between 3 and 5 volts and 0 volts, respectively. Of course, other relatively high and low signal levels can be used and, alternatively, negative logic signals can be supplied and produced by the NAND gate. A corresponding binary notation for a high can be considered a binary "1" and the binary notation for a low can be considered a "0". Thus, a NAND gate operates such that a low is produced when each input terminal of that NAND gate is supplied with a high. However, if any one input terminal is supplied with a low, the NAND gate produces a high output.

The operation of a a NOR gate is similar to that just described for a NAND gate. Those of ordinary skill in the art will recognize that a NOR gate operates in a manner similar to that of a conventional OR gate, except that each input terminal of the NOR gate acts as an inverting input terminal.

As illustrated, the gating circuit is comprised of NOR gate 212 having a first input coupled to the multiplexing circuit 202 and a second input coupled to the second output terminal of the ERASE flip-flop 266. The output of the NOR gate 212 is coupled to the comparator circuit 208 and to an input terminal of NAND gate 214. The NAND gate includes an additional input terminal coupled to the second output terminal of the CHANGE flip-flop circuit 264 and a further input terminal coupled through NOR gate 216 to an output terminal of the word counter 240. The particular output terminal of the word counter to which the NAND gate 214 is coupled is adapted to produce a low when the word count "63" has been attained. The NOR gate 216 includes an additional input terminal coupled to the first output terminal of the ERASE flip-flop circuit 266. This output terminal of the flip-flop circuit is further connected to an input terminal of a NAND gate 220. The NAND gate includes another input terminal coupled to an output terminal of the word counter 240. In particular, the word counter is adapted to supply the NAND gate 220 with a low when the count of "64" has been reached. The output of the NAND gate 220 is coupled through a NOR gate 224 to the WRITE input terminal of the recirculating memory 206. A further input of the NOR gate 224 is coupled to an output terminal of the word counter 240 so as to receive a low when the count of 63 has been attained. The output of the NAND gate 214 is coupled to the DATA IN terminal of the recirculating memory 206 through an inverting circuit 218. Those of ordinary skill in the art will recognize that the inverting circuit functions as a conventional logic inverter adapted to invert the sense of a logic signal applied thereto. In particular, the inverter 218 is adapted to produce a low in response to a high applied thereto and, conversely, to produce a high in response to an applied low.

Operation of the FIG. 2 System

Let it initially be assumed that the recirculating memory 206 has various data words stored in the recirculating data stream. It is recalled that each data word includes a plurality of time data bits and a plurality of function data bits to thereby represent a predetermined function that is to be performed at a preselected time. The function, of course, is identified by the function data bits and the time of performance is identified by the time data bits. Timing signals, not shown, are supplied from the timing control circuit 242 to the recirculating memory 206 to permit the data stream to recirculate therethrough. The length of time required for a given data word to recirculate completely through the recirculating memory 206 is equal to 64 word times. As the data words recirculate through the memory 206, the time data supplied by the clock display 12 is serialized by the multiplexing circuit 202 under the control of timing pulses supplied by the timing control circuit 242. If the programmer apparatus is disposed in its CONTROL mode of operation, it is appreciated that no function data is supplied by the function switches. Consequently, the coding circuit 204 supplies the multiplexing circuit 202 with a coded representation of the absence of function data. Nevertheless, a complete data word, i.e., a 15-bit data word, is supplied to the NOR gate 212 by the multiplexing circuit 202, wherein the function data bits of the serialized word are all low (000), representing the absence of function data. The multiplexing circuit 202 and the recirculating memory 206 are synchronzed such that the initial bit of a word supplied by the multiplexing circuit corresponds with the initial bit of a word that is recirculated from the last stage of the recirculating memory to the first stage of the memory.

When in the CONTROL mode, each of the switches 252, 254 and 256 exhibit their respective positions as illustrated. Consequently, a reference potential is applied to the second input terminal of each of the flip-flops 262, 264 and 266 whereby these flip-flops are reset to produce a respective low at the first output terminal and a high at the second output terminal. Consequently, the $\overline{\text{ERASE}}$ signal produced by the ERASE flip-flop 266 is a high. It is appreciated that a high supplied to one input of the NOR gate 212 enables that gate to respond in an inverse manner to the signals supplied to its other input. Consequently, the various highs and lows of the data word serially produced by the multiplexing circuit 202 are inverted, and these inverted bits are serially supplied to the comparator circuit 208. If the multiplexing output terminal is an inverting output terminal, it is appreciated that the NOR gate 212 supplies the first bit of a data word to the comparator circuit 208 in synchronism with the first bit of a stored data word supplied to the comparator circuit by the recirculating memory 206. That is, both the NOR gate 212 and the recirculating memory 206 synchronously supply data words in serial fashion to the comparator circuit 208. As will be described in detail below, the comparator circuit compares the stored data word and the produced data word on a bit-by-bit basis to determine whether any of the stored data words correspond to the produced data word. That is, the comparator circuit 208 examines the stored time data to determine if any of the stored times correspond to the actual time of day then obtaining.

It is recalled that the clock display 12 advances the indicated time once each minute. Thus, for the duration of an entire minute the time data supplied to the multiplexing circuit 202 is unchanged. However, during this one minute interval, it is appreciated that the recirculating data stream undergoes many recirculating cycles. For example, in accordance with the above numerical example wherein the capacity of the recirculating memory 206 has been assumed to be 1024 data bits, if the recirculating memory is supplied with data shift pulses at a rate of 5 KHz, it is appreciated that during the one minute interval, the contents of the memory are recirculated more than 290 times. Consequently, over 290 comparisons are made by the comparator circuit 208 between each stored data word and each time representation provided by the clock display 12.

It is appreciated that, during the CONTROL mode, the ERASE signal is low and the word counter 240 is disabled so as to not respond to the timing pulses supplied by the timing control circuit 242. Consequently, the outputs 63 and 64 of the word counter are provided with respective highs. Accordingly, a high is supplied to each input terminal of the NOR gate 224 to thus supply a low to the WRITE input terminal of the recirculating memory 206. Since data can be entered into the recirculating memory only if a high is applied to the WRITE input terminal, it is recognized that the stored data words are not, in any way, affected by the serialized data produced by the NOR gate 212. Hence, the contents of the recirculating memory are not disturbed.

If the actual time of day indicated by the clock display 12 corresponds to time data that is stored in the recirculating memory 206, a favorable comparison will be provided by the comparator circuit 208 and an ENABLE signal will be supplied to the function decoder circuit 232. It will be recognized that, during a CONTROL mode, the function data portion of the seralized word produced by the multiplexing circuit 202 and supplied to the comparator circuit 208 by the NOR gate 212 is not examined. Consequently, only the timing data of the stored data words and the produced data words are compared.

As a data word is shifted out of the output stage of the recirculating memory and returned to the input stage, the respective bits of that data word are shifted through the temporary storage circuit 230. These bits are simultaneously supplied to the function decoder circuit 232, the available storage location detector 236 and the synchronization detector 234. Although the temporary storage circuit 230 may comprise any convenient number of stages to thus temporarily store a corresponding number of data bits, it will soon be described that the temporary storage circuit is comprised of a 5-bit register. The outputs of these five stages are connected in parallel to the synchronization detector 244. However, since the function decoder 232 is concerned only with the function data, only three of the stages of the temporary storage circuit are connected to the function decoder. Also, as will soon be described, these same three stages are connected to the available storage location detector 236 because an indication of the availability of a storage location in the recirculation memory 236 is provided by the absence of data in the function bit locations of a data word.

Thus, as each data word is shifted through the temporary storage circuit 230, a portion of that data word is examined by the function decoder 232, the available storage location detector 236 and the synchronization detector 234. In the preferred arrangement of a data word, the function data bits immediately follow the time data bits. Accordingly, when the comparator circuit 208 supplies the ENABLE signal to the function decoder 232, the three stages of the temporary storage circuit 230 that are connected to the function decoder circuit are supplied with the three function data bits of the recirculated word. The ENABLE signal permits the function decoder 232 to decode the function data bits applied by the temporary storage circuit 230 to thus produce an output control signal on the one output terminal of the decoder that corresponds to the decoded function. Consequently, the output control signal is supplied to the corresponding relay control circuit 234 and serves to energize the relay in that relay control circuit. For example, if a data word is stored representing that function IV is to be performed at 3:45 a.m., then at 3:45 a.m. the comparator circuit 208 supplies the ENABLE signal to the function decoder 232. At the time the ENABLE signal is so applied, coded function data representing function IV is stored in the temporary storage circuit 230. The enabled function decoder 232 decodes this function data and produces an output control signal on lead IV (not shown). This control signal is thus supplied to relay control circuit IV (not shown) to energize the relay in that control circuit. Consequently, function IV is thus performed. However, if the function switch IV is disposed in its OFF condition, the control signal supplied to the output lead IV by the function decoder 232 will not be transmitted to the relay. In that event, the performance of the function IV will be suspended as long as the function IV switch is set to its OFF condition.

The foregoing operation of the illustrated apparatus is repeated and the particular functions that correspond to the function data sotred in the recirculating memory 206 are performed at those times represented by the stored time data. Of course, if plural functions are to be performed at a given time, the respective comparisons of those corresponding data words recirculated in the recirculating memory 206 with the produced data word supplied from the multiplexing circuit 202 will result in the energization of corresponding relay control circuits.

Let is now be assumed that a particular data word recirculated through the memory 206 is to be deleted. It is recognized that such data word will be deleted if the function represented by that word is no longer to be performed and/or the time of performance is to be changed. It is recalled that this operation is executed by setting the clock display 12 to a time corresponding to the time represented by the particular data word and by operating that function switch associated with the function under consideration. Accordingly, the multiplexing circuit 202 will serially form a data word that is identical to a corresponding data word in the recirculating memory. In addition, the CHANGE mode of operation is selected by appropriately operating the mode selecting switch 28 such that the switch 254 is actuated so as to supply the reference potential to the first input terminal of the CHANGE flip-flop circuit 264. Accordingly, a CHANGE signal is produced whereby a high is applied to the counter enable circuit 238 and a low is supplied to an input terminal of the NAND gate 214. The high supplied to the counter enable circuit by the change flip-flop circuit 264 conditions the counter enable circuit to actuate the word counter 240 at an appropriate time.

It is appreciated that the NAND gate 214 responds to the low supplied to its input terminal to produce high which, in turn, is inverted by the inverting circuit 218 to supply a low to the DATA IN terminal of the recirculating memory 206. The low supplied to the NAND gate 214 prevents that NAND gate from responding to the data word that is coupled from the multiplexing circuit 202 through the NOR gate 212 to an input terminal of the NAND gate. At this time, it is recognized that a low is supplied to the WRITE terminal of the recirculating memory since the ERASE flip-flop circuit 266 has remained in its reset condition, the $\overline{\text{ERASE}}$ signal supplied to the NOR gate 212 is a high. Consequently, the NOR gate supplies the data word comprised of the time data produced by the clock display 12 and the function data produced in response to the actuation of the appropriate function switch to the comparator circuit 208. Hence, the comparator circuit now compares each data word recirculated through the memory 206 with the data word produced by the multiplexing circuit 202.

When the comparator circuit detects that a stored data word is identical to the data word produced by the multiplexing circuit 202 in both function and time data, an ENABLE singal is supplied to the counter enable circuit 238. It will be shown in detail hereinbelow that the function decoder 232 does not operate when the programmer apparatus admits of any mode other than the CONTROL mode of operation.

When the ENABLE signal is applied to the counter enable circuit 238, that circuit supplies the word counter 240 with a control signal. This control signal enables the word counter to respond to the timing pulses applied by the timing control circuit 242 so as to increment the count of the word counter accordingly. It is recognized that when the comparator circuit 208 produces the ENABLE signal, the stored word that has been favorably compared to the word produced by the multiplexing circuit is returned through the input stage of the recirculating memory 206. More specifically, when the ENABLE signal is produced, the last bit in that stored word is shifted into the input stage of the memory. Consequently, the control signal applied to the word counter 240 by the counter enable circuit 238 serves to identify the particular storage location in which the word to be deleted is stored. This word advances through the recirculating memory in timed synchronization with the timing pulses applied to the word counter by the timing control circuit 242. Consequently, the word counter increments its count in synchronism with the recirculation of the identified storage location. Now, when the identified storage location has been advanced to the last location in the recirculating memory 206, that is, when the first, or space, bit of the word occupying the identified storage location is advanced to the output stage of the memory, the count attained by the word counter 240 will be incremented to the count of 63. Thus, output 63 of the word counter 240 supplies a low to the NOR gate 224, whereupon a WRITE pulse, which is a high, is applied to the WRITE input terminal of the recirculating memory. Now, instead of recirculating the last word in the recirculating memory from the output stage to the input stage of the memory, the signals provided at the DATA IN terminal are "written in" to the memory. Because the $\overline{\text{CHANGE}}$ signal is a low, the data word now written into the memory consists of a successive series of lows. In effect, then, the word that had occupied the identified storage location is replaced by a predetermined code, here consisting of sixteen successive lows. Thus, the data word corresponding to the function and time data produced by the multiplexing circuit 202 is deleted from the memory.

It is appreciated that the predetermined code now written into the recirculating memory occupies an entire data word interval. Accordingly, when the last bit of this code is written in, the word counter 240 is incremented to a count of 64. Hence, the signal provided at the output 63 of the word counter is returned to its normally high state and the signal provided at the output 64 of the word counter is now low. Thus, at a count of 64, the identified storage location is now disposed at the first word location in the recirculating data stream and is occupied by the predetermined code. The low supplied to the NAND gate 220 by the output 64 of the word counter results in a high applied to the NOR gate 224. Since this NOR gate is now supplied with a high at each input terminal, a low is coupled to the WRITE terminal of the memory 206. Consequently, no further data is capable of being written into the recirculating memory, and only the particular word under consideration has been deleted. Also, when the count 64 is attained, the word counter 240 is reset to an initial count, such as 0, and is prepared to initiate a subsequent counting cycle upon receiving another control signal from the counter enable circuit 238. However, since the previously stored word corresponding to the word produced by the multiplexing circuit 202 has been deleted from the memory, it is apparent that the comparator circuit 208 will not supply another ENABLE signal to the counter enable circuit until a further word is produced by the multiplexing circuit. The illustrated apparatus is thus prepared to execute a further operation, as desired.

Let it now be assumed that after a CHANGE operation has been performed, an operator wishes to enter a command into the memory 206 so that a predetermined function will be performed at a preselected time under the control of the programmer apparatus. This ENTER operation is achieved by setting the mode selecting switch 28 to the ENTER position such that the switch 252 is actuated to apply the reference potential to the first input terminal of the flip-flop circuit 262. It is recognized that, prior to the actuation of the switch 252, all of the switches 252, 254 and 256 exhibit their respective states as illustrated so that the reference potential is initially applied to the second input terminals of each of the flip-flop circuits. Hence, initially, each of these flip-flop circuits is reset to present highs at their respective second output terminals.

The operator will now advance the clock display 12 to indicate the desired time and will then operate the appropriate function switch to its ENTER condition so as to supply the multiplexing circuit 202 with the desired function and time data. The NOR gate 212 and NAND gate 214, being enabled to respond to the serialized data word supplied by the multiplexing circuit 202 because of the low corresponding to each of the $\overline{\text{ERASE}}$ and $\overline{\text{CHANGE}}$ signals, will supply the produced data word to the DATA IN terminal of the recirculating memory. However, the word counter 240, being normally reset to its initial count, prevents the application of a WRITE signal to the WRITE terminal of the memory. This is to prevent the erroneous writing in of data into the recirculating memory at any arbitrary storage location that might not be available to store such data word. Hence, the gating circuit 210, under the control of the word counter 240, now prevents previously stored commands from being deleted or otherwise obliterated improperly.

As the data stream recirculates through the memory 206, it is recalled that portions of each word are shifted into and temporarily stored in the temporary storage circuit 230. The outputs of three of the selected stages of the temporary storage circuit are coupled to the available storage location detector 236. IT should here be noted that the data word format is selected such that the presence of three successive lows will not occur unless a storage location is available to receive a new command. It is recalled that, when a command is deleted from the memory 206, the command is replaced by the predetermined code consisting of successive lows. In the numerical example here described, when a data word consists of sixteen data bits, it is appreciated that a storage location which is available to store a new command will consist of sixteen consecutive lows. THe available storage location detector 236 is particularly adapted to sense the occurrence of three successive lows that may be stored in the temporary storage circuit 230. In an alternative embodiment, the available storage location detector 236 is adapted to detect the occurrence of five consecutive lows. Clearly, any number of such consecutive lows may be detected to represent the availability of a storage location to store a new command.

When the detector 236 senses that a storage location included in the recirculating data stream is available to store a new command, an appropriate indication of such detection is applied to the counter enable circuit 238. The counter enable circuit is conditioned to respond to this signal by the application of an ENTER signal from the enter flip-flop circuit 262. Thus, when the timing control circuit 242 supplies a predetermined timing pulse to the counter enable circuit 238, a control signal is coupled to the word counter 240, whereby the word counter is enabled to initiate the counting of timing pulses. As will soon be described, the timing pulses that are applied to the counter enable circuit and the word counter are such that the operation of the word counter is initiated when the available storage location, as sensed by the detector 236, is shifted into the first word position of the recirculating data stream.

As in the aforedescribed CHANGE operation, the count of the word counter 240 is incremented in synchronism with the recirculation of the particular storage location as here sensed by the detector 236. That is, the recirculation of that storage location through the data stream is tracked in accordance with the counting of the timing pulses by the word counter 240. When the count of 63 is attained, the available storage location occupies the last word location in the recirculating data stream. At that time, that storage location, which is occupied by the predetermined code, is to be serially shifted through the memory output stage and returned through the input stage. However, the low provided at the output 63 of the word counter is inverted by the NOR gate 224 to apply a high WRITE pulse to the WRITE terminal of the recirculating memory. At that time, the data word which is produced by the multiplexing circuit 202 is synchronism with the recirculation of the data word through the recirculating memory is written into the recirculating memory. Consequently, the predetermined code, instead of being recirculated from the last word location to the first word location in the data stream is now replaced by the produced data word. When the last bit of this new command has been entered into the memory 206, a timing pulse is coupled to the word counter 240 by the timing control circuit 242 whereby the count of the word counter is incremented. Hence, a high is now produced at output 63 and a low is produced at output 64. These signals result in a high at each input terminal of the NOR gate 224, whereby the WRITE pulse is terminated. Thus it is seen that the WRITE pulse admits of a duration that is equal to one word interval.

It is recognized that, when the count 64 is attained, the word counter 240 is automatically reset to its initial count and now awaits a subsequent control signal applied from the counter enable circuit 238.

Further commands can be entered into the memory 206 in a manner similar to that just described. As will be described hereinbelow, when a command is entered into the memory, a visual indication is provided to apprise the operator of the successful completion of an ENTER operation. However, if an operator desires to enter a command into the memory but the full capacity of that memory has been reached, it is recognized that the detector 236 will not be capable of sensing an available storage location. In the absence of sensing such an available storage location, the counter enable circuit 238 cannot supply a control signal to the word counter 240. Accordingly, the word counter is prevented from counting the timing pulses supplied by the timing control circuit 242. If the word counter 240 cannot increment its count, a WRITE pulse cannot be supplied to the WRITE terminal of the memory. Consequently, notwithstanding the operator's intention of entering a new command into the memory, the data word supplied to the DATA IN terminal will not be written into the memory. Also, and as will be described below, the failure of the detector 236 to sense an available storage location will result in the energization of a suitable visual indicator to apprise the operator that the command cannot be entered. Of course, if it is most important that such command be entered, a CHANGE operation can be performed, as aforedescribed, to thereby delete a previously stored command, resulting in the availability of storage location. Once such storage location is made available, the aforedescribed ENTER operation can be successfully performed.

Let it now be assumed that an operator wishes to erase the entire contents of the memory 206. To achieve the ERASE mode, the mode selecting switch 28 is disposed at its ERASE position, whereby the switch 256 is closed to supply the reference potential to the first input terminal of the erase flip-flop circuit 266. This flip-flop circuit is actuated to produce a high ERASE signal at its first output terminal and a low $\overline{\text{ERASE}}$ signal at its second output terminal. The $\overline{\text{ERASE}}$ signal is applied to the NOR gate 212, resulting in a high signal at the output of that NOR gate regardless of the data signals that might be applied from the multiplexing circuit 202. As will become apparent, this $\overline{\text{ERASE}}$ signal actuates the NOR gate 212 to act as a predetermined code generator.

The high ERASE signal produced by the erase flip-flop circuit 266 is also applied to the counter enable circuit 238. In the ERASE mode, the counter enable circuit supplies an output signal to the word counter 240 at an appropriately timed instance, notwithstanding the output signals produced by the available storage location detector 236 and the comparator circuit 208. In particular, the control signal applied to the word counter 240 by the counter enable circuit 238 in response to the ERASE signal produced by the erase flip-flop circuit 266 is generated when an entire data word is shifted into the first storage location of the recirculating data stream in the memory 206. The word counter is now enabled to track that data word as it is shifted through the recirculating data stream. Thus, the word counter now counts the timing pulses received from the timing control circuit 242 in synchronism with the shifting of the recirculating data stream.

It is recognized that the 63 output of the word counter 240 is normally a high until a count of 63 is attained. Similarly, the 64 output of the word counter is normally a high until the count 64 is attained. Consequently, the NOR gate 216 is supplied with the high ERASE signal and the normally high signal produced at the 63 output of the word counter to thereby supply a low signal to the NAND gate 214.

This low signal results in a high signal applied to the inverter circuit 218, whereupon a low signal is supplied to the DATA IN terminal of the recirculating memory 206 until the count 63 is attained.

The NAND gate 220 is here supplied with a high input signal at each of its input terminals in response to the high ERASE signal and the normally high signal produced at the 64 output of the word counter. Thus, the NAND gate 220 supplies the NOR gate 224 with a low signal, whereby the NOR gate inverts that signal to supply a high signal to the WRITE input terminal of the recirculating memory. It is thus appreciated that, as the recirculating data stream is shifted through the recirculating memory 206, each word previously stored in the memory is replaced by a series of low data bits. In this manner, each storage location within the recirculating memory is effectively erased.

During the ERASE mode, a predetermined storage location is supplied with a synchronization word. This word is comprised of a predetermined code; more particularly, a series of high data bits. In the assumed numerical example described above, wherein the recirculating memory 206 admits of a capacity of 64 data words, the present invention designates the 64th data word in the recirculating data stream as the synchronization word. Thus, after the 63rd word is counted by the word counter 240, the next word to be shifted into the input stage of the recirculating memory, i.e., the 64th word, is written in as the synchronization word. This is achieved as follows:

When the count of 63 is attained by the word counter, the low signal produced at the 63 output results in a high signal supplied to the NAND gate 214 by the NOR gate 216. Consequently, when the 64th data word is shifted out of the output stage of the recirculating memory, the NAND gate 214 is supplied with a high $\overline{\text{CHANGE}}$ signal, a high signal supplied by the NOR gate 212 and a high signal supplied by the NOR gate 216 to thereby produce an output low signal. This low signal is inverted by the inverter circuit 218 and applied as a high signal to the DATA IN terminal of the memory 206. Consequently, the 64th word in the recirculating memory is written in as a series of high data bits, the code reserved for the synchronization word. It is appreciated that, during the ERASE mode, the NOR gate 216 and the NAND gate 214 cooperate to act as the synchronization word generator.

AFter the synchronization word is fully written into the recirculating memory 206, the word counter 240 attains the count of 64. Consequently, a low signal is supplied to the NAND gate 220 by the 64 output of the word counter to thereby apply a high signal to the NOR gate 224. Also, the signal produced at the 63 output of the word counter now is a high signal. The application of a high signal at each input terminal of the NOR gate 224 results in a low signal supplied to the WRITE input terminal of the memory. Accordingly, further information is prevented from being written into the recirculating memory, and the recirculating data stream now consists of a synchronization word and a plurality of erased storage locations, each now being readily available to store function and time data.

As will be shown hereinbelow, the presence of the synchronization word in the recirculating memory 206 serves to resynchronize the timing control circuit 242 with the recirculating data stream. In particular, such resynchronization is achieved at the start of each memory circulating cycle. That is, when the synchronization word is shifted through the last stages of the recirculating memory and is temporarily stored in the temporary store circuit 230, the presence of consecutive high data bits, being reserved only for the synchronization word, is sensed by the synchronization word detector 244. In response to the sensed synchronization word, the detector 244 applies a RESYNC signal to the timing control circuit 242. This RESYNC signal resets all of the timing circuits in the timing control circuits to an initial state. The timing control circuit is thus enabled to now initiate its normal production of timing pulses in synchronism with the shifting of data words through the recirculating memory 206.

Although the foregoing detailed description has explained the general construction and operation of the logic system included in the programmer apparatus, the following description will clarify various ones of the circuits depicted in the system diagram of FIG. 2.

TIMING CONTROL CIRCUIT

Figure 3:
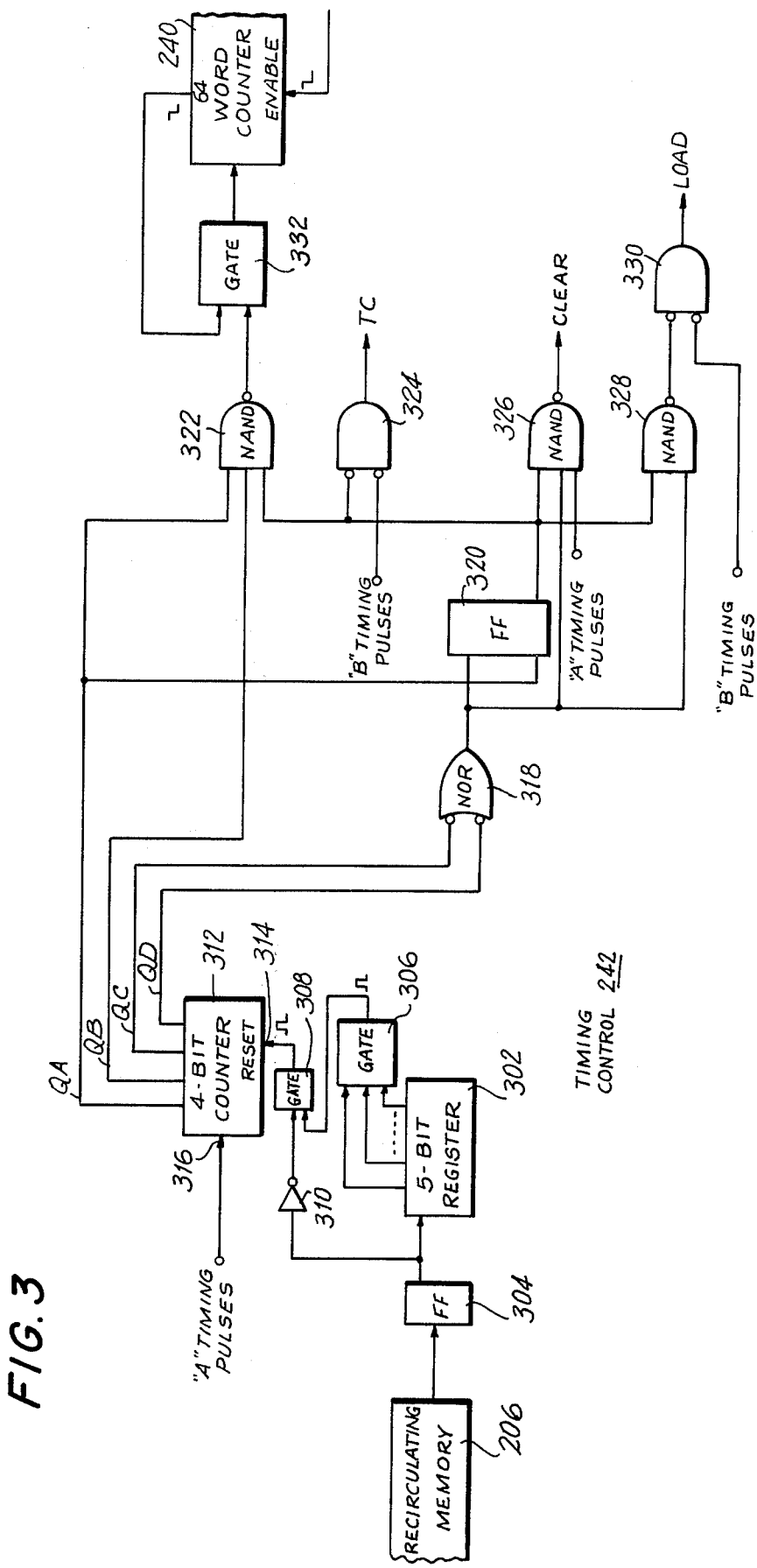
FIG. 3 is a logic diagram representing the timing control circuitry of the programmer apparatus.

It is now appreciated that the timing control circuit 242 functions to synchronize the operation of the various circuits included in the system of FIG. 2. A logic diagram illustrating the components of the timing control circuit and the manner in which various circuits of the programmer apparatus are controlled by such logic components are depicted in FIG. 3. The timing control circuit is comprised of a binary counter 312 and various gating circuits coupled to the output terminals of the binary counter. In accordance with the numerical example assumed above wherein each data word is comprised of 16 data bits and, more particularly, is comprised of 15 useful data bits and a word separation bit, the binary counter 312 is, typically, a conventional 4-bit counting circuit. The counter 312 includes a reset terminal 314 and a timing input terminal 316. A high RESET signal supplied to the reset terminal 314 will reset the counter 312 to an initial count, such as (0000). Timing pulses supplied to the input terminal 316 cause the counter 312 to increment the count exhibited thereby. Those of ordinary skill in the logic circuitry art will fully appreciate that the 4-bit counter is adapted to be incremented in response to timing pulses supplied to the input terminal 316 from an initial count (0000) to a maximum count (1111) and will then be automatically reset to its initial count to resume its counting cycle. A (0) is here assumed to be represented by a low signal and a (1) is assumed to be represented by a high signal. In an alternative embodiment, the digital representations are interchanged.

The input terminal 316 of the counter 312 is adapted to be supplied with periodic timing pulses of a predetermined repetition rate. These timing pulses are designated "A" timing pulses and are generated by a master clock source, not shown. As will be described hereinbelow, the timing control circuit is also adapted to receive pulses designated "B" timing pulses. The A and "B" timing pulses are of the same frequency and exhibit a 180° out-of-phase relationship.

The reset terminal 314 of the counter circuit is coupled to the synchronization detector circuit 244 of FIG. 2. The synchronization detector circuit, together with the temporary storage circuit 230 of the previously described system diagram are here depicted as comprising the shift register 302 coupled to the recirculating memory 206 by a flip-flop circuit 304. The individual output terminals of the shift register 302 are coupled to a coincidence circuit 306, the output of which is coupled to a further coincidence circuit 308. The flip-flop circuit 304 is also coupled to the coincidence circuit 308 by an inverter circuit 310. As will be recognized, a coincidence circuit is adapted to produce a predetermined output signal when each input terminal is supplied with an identical signal. That is, the coincidence circuit is adapted to produce an output high signal when each input terminal is supplied with a high signal. Alternatively, a coincidence circuit is adapted to produce an output low signal when each input terminal is supplied with a low signal. Thus, the coincidence circuit 306 may comprise a conventional AND gate. In an alternative embodiment, the coincidence circuit is comprised of various NOR gates, NAND gates and inverter circuits of the type previously described with respect to FIG. 2, to thereby perform a coincidence detecting function. For the purpose of the present description, it may be assumed that the coincidence circuit 306 is adapted to produce an output high signal in response to a high input signal applied to each input terminal. The coincidence circuit 308 is similar to the coincidence circuit 306.

The output terminals of the binary counter 312 are designated QA, QB, QC and QD. Output terminal QA is coupled to a NAND gate 322 and to the first input terminal of a flip-flop circuit 320. The flip-flop circuit is similar to the aforedescribed flip-flop circuits 262, 264 and 266 and is adapted to produce a high signal at its first output terminal in response to a high signal applied to its first input terminal. Also, the high output signal is adapted to be switched to a low signal in response to a high signal applied to the second input terminal of the flip-flop circuit. As illustrated, another input terminal of the NAND gate 322 is coupled to the output terminal of the flip-flop circuit 320. The flip-flop circuit output terminal is further coupled to the NAND gates 326 and 328. The output terminal of the flip-flop circuit is also coupled to a circuit 324 designated a NOT AND gate. A NOT AND gate is adapted to produce a high output signal when, and only when, a low input signal is applied to each input terminal. In the absence of this condition, the NOT AND gate produces a low output signal.

The remaining input terminal of the NAND gate 322 is connected to the QB output terminal of the counter 312. The NAND gate is adapted to produce output signals in synchronism with the recirculation of data words through the recirculating memory 206. In particular, the NAND gate 322 is capable of producing a low output signal in timed coincidence with the last, or 16th, data bit of a data word. The output signal of the NAND gate 322 is coupled to a timing pulse input terminal of the word counter 240 via a coincidence circuit 332. The coincidence circuit 332 is similar to the aforedescribed coincidence circuit 306 and includes a further input coupled to the 64 output of the word counter.

The word counter 240 is a binary counter similar to the counter 312. In accordance with the aforedescribed numerical example, the word counter is adapted to attain a count of 64 and is thus comprised of a six stage binary counter including an enable input terminal and a timing pulse input terminal. A low signal applied to the enable input terminal enables the word counter to respond to the negative transitions of the timing pulses supplied to the timing pulse input terminal. The word counter is disabled and is thus prevented from counting the supplied timing pulses when a high signal is applied to the enable terminal. As will soon be described, the 64 output of the word counter 240 is coupled to the coincidence circuit 332 so as to prevent further timing pulses from being applied to the word counter.

The output terminals QC and QD are connected to a NOR gate 318. This NOR gate is similar to the aforedescribed NOR gate 212 and, in the interest of brevity, further description need not be provided. The output terminal of the NOR gate 318 is connected to the second input terminal of the flip-flop circuit 320 and, additionally, to each of the NAND gates 326 and 328. The NAND gate 326 is adapted to produce a "CLEAR" output pulse for a purpose soon to be described, and includes a third input terminal adapted to be supplied with the aforementioned A timing pulses. The NAND gate 328 is used to produce a "load" pulse for a purpose soon to be described and is connected to one input terminal of a NOT AND gate 330. The other input terminal of the NOT AND gate is supplied with the aforementioned B timing pulses. To produce a "TC" pulse for a purpose soon to be described, the NOT AND gate 324 includes a first input terminal connected to the output terminal of the flip-flop circuit 320, as aforedescribed, and a second input terminal adapted to be supplied with the B timing pulses.

Figure 7:
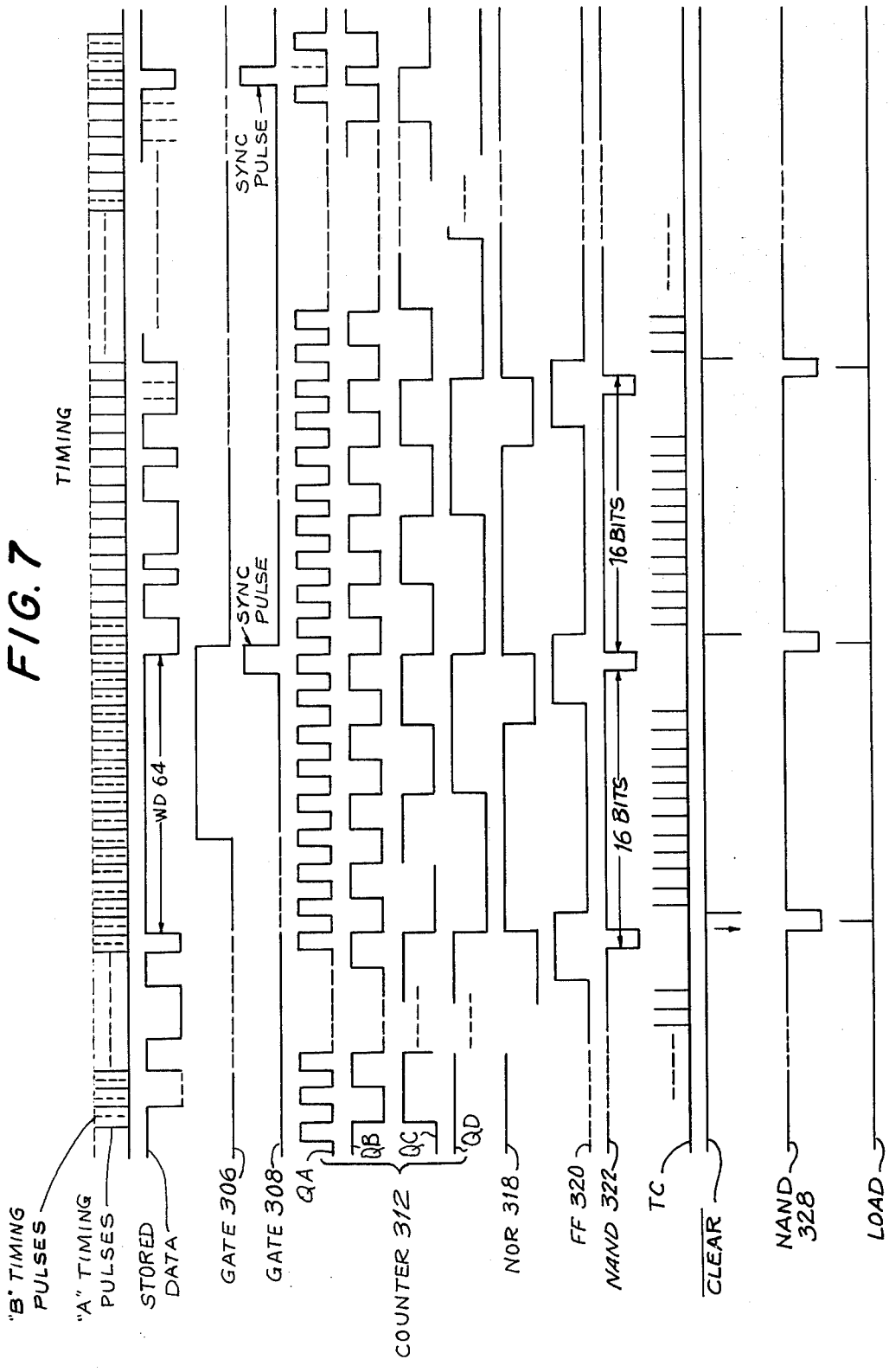
FIG. 7 is a waveform diagram that is useful in explaining the operation of the timing control circuit.

To facilitate a ready understanding of the operation of the timing control circuit illustrated in FIG. 3, its operation will now be decribed in conjunction with the waveform representation depicted in FIG. 7. It may be recognized that the timing control circuit functions in a substantially identical manner for each of the data words recirculated by the memory 206. It is recalled that a predetermined synchronization word is shifted through the recirculating data stream. Accordingly, the following description will assume that the last data word, i.e., word 64, corresponds to the synchronization word and the specific operation of the timing control circuit will be described with reference to word 64 and the following word 1.

Although not shown, the words shifted through the recirculating memory 206 are synchronzied with the master clock pulses such as the A timing pulses. The preferable data word format is arranged such that the first word bit of a data word represents a word separation interval, the second through the thirteenth bits represent the time data derived form the clock display and the last three bits, i.e., bits 14, 15 and 16, are representations of the function data derived from the function switches. This data word format is particularly established such that five consecutive high signals (1 1 1 1 1) will never occur except for the predetermined synchronization word which, it is recalled, consists of sixteen consecutive high signals. Accordingly, for word number 64, the word separation interval is omitted.

The counter 312 operates in the conventional manner in response to the A timing pulses applied to the timing input terminal 316 so that the pulse train produced at the output terminal QA exhibits a frequency that is one-half the A timing pulse frequency; the pulse train produced at the output terminal QB exhibits a frequency that is one-fourth the A timing pulse frequency; the pulse train produced at the output terminal QC exhibits a frequency that is one-eighth the A timing pulse frequency; and the pulse train produced at the output terminal QD exhibits a frequency that is one-sixteenth the A timing pulse frequency. If it is further assumed that the counter 312 operates in response to negative transitions, the resultant output pulse trains generated by the counter appear as depicted in FIG. 7 as signals QA, QB, QC and QD.

As each data word in serially shifted from the output stage of the recirculating memory to the input stage of the memory, the data word is also shifted through the flip-flop circuit 304 into the shift register 302. The shift register 302 is adapted to detect the presence of the synchronization word. Accordingly, in one embodiment of the present invention, the shift register comprises a sixteen state register having an output terminal from each stage connected to the coincidence circuit 306. However, it is recalled that the occurrence of five successive high signals is reserved solely for a synchronization word. Accordingly, to minimize complexity and expense in construction, the shift register is preferably a five-bit register.

As data words are recirculated, and as bits are shifted through the register 302, the coincidence circuit 306 will normally produce a low output signal. However, when five consecutive bits of the synchronization word are shifted into the register 302, it is appreciated that the coincidence circuit 306 will be supplied with a high signal at each input terminal. Consequently, from the time bit number five of the synchronization word is shifted into the register 302 until bit number sixteen is shifted into the register, the coincidence circuit 306 will supply a high signal to the coincidence circuit 308. However, it is recognized that as each bit is shifted into the register 302, the immediately succeeding bit is shifted into, and thus stored by, the flip-flop circuit 304. The representation of the bit stored in the flip-flop circuit is inverted by the inverter circuit 310 and supplied to the coincidence circuit 308. Thus, as the fifth bit of the synchronization word is shifted into the register 302, the sixth bit, which is a high signal, is stored in the flip-flop circuit 304. This high signal is logically inverted and supplied as a low signal to the coincidence circuit 308. Consequently, the coincidence circuit 308 supplies a low signal to the reset terminal 314 of the counter 312. Such a low signal is so applied to the reset terminal of the counter circuit until the last, or sixteenth, bit of the synchronization word is shifted into the register 302. At that time, it is appreciated that the immediately succeeding bit, i.e., a data word separation interval represented by a low signal, is stored in the flip-flop circuit 304. Consequently, the last five high signals of the synchronization word result in a high signal applied to the coincidence circuit 308 by the coincidence circuit 306. Also, the low signal now stored in the flip-flop circuit 304 is inverted and supplied as a high signal to the coincidence circuit 308 by the inverter circuit 310. Consequently, a high signal is now supplied as a reset signal to the reset terminal 314 of the counter 312. This reset signal is depicted as the synchronization pulse produced by the coincidence circuit 308, as illustrated in FIG. 7. Although not shown in the logic circuit of FIG. 3, to permit a stable condition to exist in the register 312 prior to the generation of the synchronization pulse, the gate circuit 306 additionally may be supplied with the B timing pulses. Nevertheless, the counter 312 responds to the synchronization pulse supplied to its reset terminal 314 to thereby assume an initial count corresponding to a low signal at each output terminal QA, QB, QC, and QD. The next succeeding A timing pulse applied to the timing input terminal 316 enables the counter 312 to resume its counting of supplied timing pulses. It will soon become apparent that the stored synchronization word provided for the automatic resynchronization of the timing circuit to the data stored in the memory in the event of a power failure.

The NOR gate 318 normally produces a high output signal except for that interval during the normal counting cycle of the counter 312 that coinciding high signals are present at the counter output terminals QC and QD. It is now recognized that the counter circuit 312 is synchronized with the synchronization words such that the output terminals QC and QD are provided with coinciding high signals for only the last four bits of a data word. Consequently, a high signal is supplied to the second input terminal of the flip-flop circuit 320 for the first twelve bits of a data word and a low signal is supplied to the second input terminal of the flip-flop circuit for the last four bits of the data word. Accordingly, the flip-flop circuit is normally conditioned such that a low signal is produced at the first output terminal of the flip-flop circuit for the first twelve bits of the data word. When the NOR gate 318 supplies a low signal to the flip-flop circuit, the flip-flop circuit is adapted to be conditioned so as to produce a high signal at its output terminal if a high signal is then supplied to its first input signal. As is apparent from the depicted waveform diagram, at the next A timing pulse interval after the NOR gate 318 produces a low output signal, the output terminal QA of the counter 312 is provided with a high signal. Consequently, at that time, i.e., at the immediately succeeding A timing pulse interval after the NOR gate 318 produces a low signal, the flip-flop circuit 320 is conditioned (hereinafter "set") to produce a high signal at its output terminal.

This high signal is supplied to the NAND gate 322. When the signals produced at the output terminals QA and QB of the counter 312 are high signals during the interval that the flip-flop circuit 320 admits of its "set" state, the NAND gate 322 produces a low output signal. As is seen from FIG. 7, the low output signal produced by the NAND gate coincides with the last bit interval of a data word. That is, the low output signal produced by the NAND gate 322 occurs at the sixteenth bit of a data word. Since the signal applied to the coincidence circuit 332 by the NAND gate 322 is normally a high signal, and since the signal normally produced at the 64 output of the word counter 240 is normally a high signal, it is recognized that the coincidence circuit 332 supplied a low signal pulse to the word counter when the NAND gate 322 produces the indicated low output signal. Accordingly, the word counter 240, which is responsive to negative transistors, is adapted to increment its count at the conclusion of each data word. The word counter thus effectively counts each data word that is recirculated through the recirculating data stream of the memory 206. More particularly, when a word recirculates, for example, from word position 64 to word position 1 in the recirculating memory, the count exhibited by the word counter is incremented. Hence, depending upon the particular word that occupies the first (or last) word position in the recirculating memory, the incrementing count of the word counter serves to track the advance of that given word through the memory.

It is recognized that, when the flip-flop circuit 320 admits of its set condition to supply a high signal to the NOT AND gate 324, that gate is disabled so as to produce a low output TC signal. However, during the interval that the flip-flop circuit remains in its "reset" state, the low output signal produced by the flip-flop circuit effectively enables the NOT AND gate 324 to produce output pulses that coincide with the B timing pulses applied to the NOT AND gate. Accordingly, when the flip-flop circuit 320 is reset by the high output signal produced by the NOR gate 318 at the conclusion of the first bit of a data word, i.e., the conclusion of the word separating interval, the NOT AND gate 324 is conditioned to respond the B timing pulses. It is recalled that the flip-flop circuit 320 admits of its reset state from the second bit time to the thirteenth bit time, inclusive. Hence, the B timing pulses that are generated during such second through thirteenth bit times are reproduced as the TC output pusles by the enabled NOT AND gate 324. However, as the flip-flop circuit 320 is actuated to its set state at the conclusion of the thirteenth bit interval, the NOT AND gate 324 is prevented from continuing its production of TC output pulses. Stated otherwise, the TC output pulses are generated during the time data bit intervals but are not generated during the function data bit intervals or during the data word separation intervals. As will soon be described, the TC pulses are used in the comparator circuit to sample the time data.

The NAND gate 326 generates a CLEAR pulse that is used by the comparator circuit as will be described. The CLEAR pulse corresponds to an A timing pulse that occurs during the interval when the flip-flop circuit 320 admits of its set state and supplies a high input signal to the NAND gate 326, and when the NOR gate 318 supplies a high input signal to the NAND gate. Referring to FIG. 7, it is appreciated that the CLEAR pulse is generated at the conclusion of the bit interval wherein the high signal produced by the NOR gate 318 and the high signal produced by the flip-flop circuit 320 overlap. This overlap interval coincides with the first bit interval of a data word, that is, the word separation interval. At the conclusion of this first bit interval, when an A timing pulse is produced, the CLEAR pulse signal is generated. It is appreciated that the CLEAR pulse signal designates the start of data.

During the first bit interval of a data word when the high signal produced by the NOR gate 318 and the high signal produced at the output terminal of the flip-flop circuit overlap, the NAND gate 328 produces a low output signal, as represented in FIG. 7. Now, during this first bit interval when the NAND gate 328 produces a low output pulse, the occurrence of a negative-going B timing pulse is sufficient to actuate the NOT AND gate 330 to produce a high LOAD pulse. Consequently, the LOAD pulse is generated during the first bit interval of each data word.

The TC pulses produced by the NOT AND gate 324, the CLEAR pulses produced by the NAND gate 326 and the LOAD pulses produced by the NOT AND gate 330 are used by the various circuits represented in FIG. 2, and in particular the comparator circuits, the available storage location detector circuit and the counter enable circuit, to achieve their aforementioned operation. One embodiment of the construction of the particular circuits, and the manner in which these circuits operate, will now be described.

COMPARATOR CIRCUIT

The comparator circuit 208 is comprised of a plurality of logic gating circuits and further includes flip-flop circuits 414 and 416. It is recalled that the comparator circuit is adapted to serially compare each recirculating data word in the recirculating memory 206 and each serialized data word produced by the multiplexing circuit 202. In particular, and as illustrated in FIG. 4, the comparator circuit is coupled to the NOR gate 212 and to the output stage of the recirculating memory 206. In this manner, the comparator circuit is adapted to serially receive each data bit supplied by the multiplexing circuit 202 through the NOR gate 212 and to serially receive each data bit as a data word is shifted out of the output stage of the recirculating memory 206 and returned to the input stage of the memory.

As illustrated, the output terminal of the NOR gate 212 is connected in common to the AND gate 408 via the inverting circuit 404 and to the AND gate 410. Those of ordinary skill in the logic circuitry art will recognize that, in accordance with the convention established throughout the present description, an AND gate is adapted to produce a high output signal when, and only when, each input terminal of that AND gate is supplied with a high signal.

As also illustrated, the output stage of the recirculating memory 206 is connected through the inverting circuit 402 to the AND gate 408 (through the inverting circuit 406) and to the AND gate 410.

The output terminals of the AND gates 408 and 410 are connected to respective input terminals of a NOR OR gate 412. Those of ordinary skill in the logic circuitry art will recognize that a NOT OR gate is adapted to produce a high output signal when, and only when, each signal supplied to an input terminal of the gate is a low signal. If any input signal is a high signal, the output signal produced by a NOT OR gate is a low signal. The AND gates 408 and 410 together with NOT OR gate 412 can be constructed in a single circuit, such as model SN7451N manufactured by Texas Instruments, Inc. of Dallas, Texas.

It may be appreciated that, when the inverting circuits 402, 404 and 406, together with the AND gates 408 and 410 and the NOT OR gate 412 are interconnected in the illustrated manner, the resultant circuit operates as an EXCLUSIVE-OR network. That is, in an EXCLUSIVE-OR network, a high output signal is derived when, and only when, the signals supplied to the EXCLUSIVE-OR network are different. More particularly, if one of the input signals is a low signal and the other input signal is a high signal, the EXCLUSIVE-OR network operates to produce a high output signal. However, if both input signals are low signals, or, conversely, if both input signals are high signals, the EXCLUSIVE-OR network operates to produce a low output signal.

The output terminal of the NOT OR gate 412 is connected in common to the flip-flop circuits 414 and 416. The flip-flop circuits are similar and each comprises a timing controlled bistable multivibrator, such as a J-K flip-flop device. This device includes a J input terminal, a K input terminal and a timing pulse ("T") input terminal. The timing pulse controlled flip-flop circuit also includes a reset input terminal. The flip-flop device is adapted to be set to a first output state if an appropriate signal is applied to the J input terminal in coincidence with a timing pulse applied to the timing pulse terminal, and to be reset to a second output state if a suitable signal is applied to the reset input terminal. In particular, if a high signal is applied to the J input terminal, the flip-flop circuit will be set to its set state in response to the application of a timing pulse to the timing pulse input terminal. In the event that a low signal is applied to the J input terminal, the flip-flop circuit will be unaffected. To avoid a false triggering to the reset state, as by spurious signals, the "K" input terminal is coupled to ground. Furthermore, in the timing pulse controlled flip-flop circuits, if a negative-going signal is applied to the reset terminal, the flip-flop circuit will be actuated to its "reset" state, notwithstanding the various signals supplied at that time to the J and timing pulse input terminals.

As illustrated in FIG. 4, the J input terminal of each of the flip-flop circuits 414 and 416 is connected to the output terminal of the NOT OR gate 412. The reset terminals of the flip-flop circuits are connected in common to the aforedescribed timing control circuit and are adapted to receive a CLEAR pulse at the start of each data word. Flip-flop circuit 414 is adapted to be supplied with the B timing pulses and the flip-flop circuit 416 is adapted to be supplied with the TC pulses generated by the timing control circuit.

The operation of the illustrated comparator circuit will not be described for the typical CONTROL mode of operation. It is recalled that, in the CONTROL mode, the time data derived from the clock display and serialized by the multiplexing circuit 202 is compared on a bit-by-bit basis with the time data portion of each data word included in the recirculating data stream in the memory 206. If the time data derived from the clock display is identical to the time data portion of a stored data word, the function data portion of that stored word is decoded and used to operate an associated output control device to thereby perform the predetermined function.

It is appreciated that the operation of the multiplexing circuit 202 is fully synchronized with the operation of the recirculating memory 206. That is, the first data bit, i.e., the word separating interval, serialized by the multiplexing circuit 202 coincides in time with the first data bit that is shifted from the output stage and returned to the input stage of the recirculating memory. Of course, the succeeding data bits serialized by the multiplexing circuit coincide in time with the succeeding bits of the shifted data word. Except for the synchronization word, the first data bit does not represent useful information. Consequently, the comparator circuit does not utilize this first data bit, which may be essentially ignored. At the conclusion of the first data bit interval, a CLEAR pulse, as described above with respect to FIG. 3, is generated. The CLEAR pulse supplied to the reset terminals of the flip-flop circuits 414 and 416 reset these flip-flop circuits to their respective reset states.

As each of the succeeding data bits is supplied to the NOR gate 212 and is shifted out of the memory 206 in synchronism, the inverting circuits 402, 404 and 406, together with the AND gates 408 and 410 and NOT OR gate 412 determine whether the respective bits are identical. More particularly, if a data bit serialized by the multiplexing circuit 202 corresponds with a data bit of a stored data word, the NOT OR gate 412 produces a low output signal. The low signal is simultaneously supplied to the J input terminals of the flip-flop circuits 414 and 416. Consequently, these flip-flop circuits do not change their respective states when the respective B timing pulses and the TC pulses are applied to the timing pulse input terminals. However, once a serialized data bit differs from a stored word data bit, the NOT OR gate 412 produces a high output pulse, whereby the respective flip-flop circuits are changed to their respective set states. This operation is graphically represented by the waveform diagram of FIG. 8.

It is recognized that the flip-flop circuit 416 is supplied with the aforedescribed TC pulses. Since these pulses are generated only during the time data portion of a data word, that is, only during data bit intervals two through thirteen inclusively, any discrepancy between the function data of a stored word and the remaining data bit intervals produced by the multiplexing circuit 202 have no effect upon the operation of the flip-flop circuit 416. Thus, if the time data portion of a stored word is in exact correspondence with the time data derived from the clock display and serialized by the multiplexing circuit 202, the NOT OR gate 412 will supply a low signal to the J input terminal of the flip-flop circuit 416 for at least the duration encompassed by the bit intervals two through thirteen. Accordingly, the flip-flop circuit 416 will remain in its reset state for an entire interval such that, upon the occurrence of a LOAD pulse, as generated in the manner described with respect to FIG. 3, the reset state of the flip-flop circuit 416 will produce a DECODER ENABLE output signal. However, if the time data portion of a stored data word does not correspond exactly with the time data derived from the clock display, then during at least some part of the interval defined by the second and thirteenth data bits, a high signal will have been applied to the J input terminal of the flip-flop circuit 416 so as to set that flip-flop circuit to its set state. Consequently, upon the occurrence of the next LOAD pulse, the set state of the flip-flop circuit will prevent the generation of a DECODER ENABLE signal.

From the foregoing description it is apparent that the flip-flop circuit 414 is not effectively used during a CONTROL mode of operation. This flip-flop circuit is used, however, during a CHANGE mode of operation. It is recalled that, during a CHANGE mode, a particular stored data word is identified and is erased from the recirculating memory. That is, both the time data portion and the function data portion of the stored data word must correspond to the time and function data that is serially produced by the multiplexing circuit 202. Thus, all fifteen useful data bits of each data word that is shifted through the recirculating memory are compared on a bit-by-bit basis with the serialized data word produced by the multiplexing circuit 202.

It is now fully appreciated that, after a CLEAR pulse is supplied to the reset terminal of the flip-flop circuit 414, the flip-flop circuit will remain in its reset state if and only if each bit of a stored data word is in exact correspondence with each bit of the word serialized by the multiplexing circuit 202. If such exact correspondence is detected, a favorable comparison is indicated at the occurrence of the next LOAD pulse by the CHANGE OK signal produced by the flip-flop circuit 414 when in its reset state. However, if, during the serial comparison of a stored data word with a data word produced by the multiplexing circuit, a difference is detected between at least one of the bits, the NOT OR gate 412 supplies a high signal to the J input terminal of the flip-flop circuit 414. At the next B timing pulse, this high signal sets the flip-flop circuit 414 to its set state. Thus, when the next LOAD pulse is generated, the CHANGE OK signal is not produced.

It is recalled that during an ERASE mode of operation, the comparator circuit is not used. Thus, when an ERASE mode is selected, the $\overline{\text{ERASE}}$ signal supplied to the NOR gate 212 is a low signal, resulting in a high signal supplied to the inverting circuit 404 and to the AND gate 410. This constant high signal prevents the comparator circuit from effective operation. More particularly, the constant high signal provided at the NOR gate 212 finds no correspondence in any of the stored data words, except for the synchronization word. It is thus expected that, for each useful data word wherein function and time data is represented, neither the DECODER ENABLE nor the CHANGE OKAY signals will be produced.

It is appreciated that, if more than one function is to be performed at a given time, then a corresponding number of data words will be stored in the recirculating memory 206 having the identical time data portion. Accordingly, the DECODER ENABLE signal will be produced whenever the time data derived from the clock display is identical to each of these stored words. For example, if, at 3:45 a.m., two functions are to be performed, then when the time of day is 3:45 a.m., two individual DECODER ENABLE signals will be produced for each recirculating memory cycle during the one minute interval that the time 3:45 is displayed.

The manner in which the DECODER ENABLE and CHANGE OK signals are utilized by the comparator apparatus is set forth in detail hereinbelow with respect to FIGS. 5 and 6.

COUNTER ENABLE CIRCUIT — AVAILABLE STORAGE LOCATION DETECTOR

Referring now to FIG. 5, there is illustrated a logic diagram of the counter enable circuit 238 and the available storage location detector 236. The counter enable circuit is comprised of a flip-flop circuit formed of NOR gates 516 and 518, interconnected in the conventional manner. An additional input terminal of the NOR gate 518 is connected to the series of switches 252, 254 and 256, previously described with respect to FIG. 2. Accordingly, the NOR gate 518 is adapted to receive a low input signal only when the control switches all admit of their respective states, as illustrated in FIG. 2. The output terminal of the NOR gate 518 is adapted to produce a RESET signal to be supplied to the word counter 240. As previously described, a RESET signal applied to the word counter is effective to reset that counter to an initial predetermined count (e.g. zero), and to then enable the word counter to respond to the pulses supplied thereto by the NAND gate 322 via the coincidence circuit 332.

The NOR gate 516 includes an input terminal connected to the output terminal of a NOT OR gate 512 and a further input terminal connected to the output terminal of a NAND gate 514. It is recognized that, when the NOR gate 516 produces a high output signal, a resultant low RESET signal is produced by the NOR gate 518. This RESET signal is adapted to be produced when the NOR gate 516 is supplied with a low input signal from either the NOT OR gate 512 or the NAND gate 514, depending upon the particular mode of operation in which the programmer apparatus is disposed.

The output of the NOR gate 516 is further connected to the visual indicator 30 via the inverting circuit 528. The visual indicator 30 is preferably a light emitting diode having an anode connected to a suitable source of energizing potential. When the light emitting diode is energized, a suitable visual indication is provided. This visual indication is here designated the COMMAND ENTERED indication which is adapted to apprise an operator that a desired command, such as the entry of data into the memory, the erasure of a selected stored data word, or the erasure of the entire contents of the memory, has been effected.

The available storage location detector is comprised of a plurality of gating circuits, together with a visual indicating device. It is recalled that this detector is adapted to sense whether any of the storage locations in the recirculating data stream in the memory is capable of storing a data word representing function and time data. It is further recalled that a recirculating data word that is comprised of a predetermined code, such as sixteen successive low signals forming the data word, represents an available recirculating storage location. For the purpose of the present invention, it should be recognized that it is far more important for the function data portion of a stored data word to consist of successive low signals than for the entire data word to consist of successive low signals. More specifically, if the function data portion consists of successive low signals, then, regardless of the spurious contents of the time data portion of the word, no function is represented thereby and no erroneous function will be performed even if the spurious time data portion happens to correspond with an actual time of day. Thus, to determine whether a storage location is available to store a data word, only the function data portion of each storage location need be examined.

In the numerical example assumed hereinabove, the function data is represented by a three-bit code. Accordingly, only these three function data bits need be examined to determine the availability of a storage location to store a data word. It is recalled that, as a data word is serially shifted from the output stage and returned to the input stage of the recirculating memory, that data word is additionally shifted through the shift register 302. Since only the function data bits of a data word are here under consideration, only the three least significant stages of the shift register 302 need be utilized by the detector 236. As illustrated in FIG. 5, the output terminals of the first two stages of the shift register 302 are connected to the NOT AND gate 502. The NOT AND gate is similar to the NOT AND gate 324 and includes an output terminal connected to a NAND gate 504. Another input terminal of the NAND gate 504 is adapted to receive the LOAD pulses generated by the timing control circuit illustrated in FIG. 3. The output terminal of the NAND gate 504, together with the output terminal of the third stage of the shift register 302, are connected to respective input terminals of a NOT AND gate 506. The output terminal of the NOT AND gate 506 is connected to one input terminal of an AND gate 508, the other input terminal of which is adapted to receive an ENTER signal. It is recalled that the ENTER signal is produced by the enter flip-flop circuit 262 when the switch 253 is disposed to actuate the flip-flop circuit. The output terminal of the AND gate 508 is coupled to an input terminal of the NOR gate 516 via a NOT OR gate 512. The NOT OR gate 512 is substantially similar to the aforedescribed NOT OR gate 412.

A further AND gate 510 is connected to another input terminal of the NOT OR gate 512 and is adapted to receive a LOAD signal generated by the timing control circuit illustrated in FIG. 3, as well as an ERASE signal generated by the aforedescribed erase flip-flop circuit 266. The AND gates 508 and 510 in combination with the NOT OR gate are substantially similar to the combination of AND gates 408 and 410 and NOT OR gate 412. Accordingly, the gates 508, 510 and 512 may be formed of a single logic circuit.

The NOT AND gate 506 is additionally connected to a monostable multivibrator circuit 520 which preferably is a one-shot circuit. The one-shot circuit is adapted, when actuated, to produce a high output signal at the conclusion of a predetermined time-out interval subsequent to its actuation. However, if, prior to the expiration of this predetermined time, the one-shot circuit is again actuated, the time-out interval is reset. The output terminal of the one-shot circuit 520 is connected to a visual indicator 32 via a NAND gate 522. THE NAND gate includes an additional input terminal connected to a NAND gate 521, the latter being adapted to detect when a function switch is actuated. The visual indicator 32 preferably comprises a light emitting diode and is therefore similar to the visual indicator 30. The indicator 32 is here designated the overload indicator and the light emitting diode includes an anode connected to a suitable source of energizing potential.

The NOR gate 516 of the counter enable circuit 238 includes a further input terminal that is connected to a NAND gate 514. The NAND gate is adapted to receive the LOAD signal produced by the aforedescribed timing control circuit, the CHANGE signal produced by the aforedescribed change flip-flop circuit 264 and the CHANGE OK signal produced by the aforedescribed flip-flop circuit 414.

The operation of the apparatus as illustrated in FIG. 5 will now be described for the assumed condition wherein the programmer apparatus is disposed in its ENTER mode. To facilitate a ready understanding of the operation of the available storage location detector 236 and the counter enable circuit 238, FIG. 5 will be described in conjunction with the explanatory waveforms of FIG. 9. It is recalled that, in the ENTER mode, the mode selecting switch 28 is operated such that switch 252 is closed to actuate the enter flip-flop circuit 262, whereby the ENTER signal is produced. Additionally, a predetermined function switch is operated to its ENTER condition after the clock display 12 is advanced to a preselected display. Although not shown herein, the foregoing operation results in actuating the one-shot circuit 520 such that a high output signal will be produced by that circuit unless the input terminal of the one-shot circuit is supplied with a high signal prior to the expiration of its predetermined time-out interval.

As the storage location in the recirculating data stream recirculates through the memory 206, successive data bits are shifted through the shift register 502. It may be assumed that consecutive ones of some of these bits may be represented by low signals as the data words recirculate. It is thus expected that the NOT AND gate 502 will occasionally apply a high signal to the NAND gate 504. However, this operation of the NOT AND gate will have no effect upon the NAND gate 504 until a LOAD signal is supplied. Now, when the function data bit locations of an available storage location are stored in the shift register 302, the output terminals of the first three stages of the shift register will each be provided with low signals. It is appreciated that the function data bits are immediately followed by the first bit location of an immediately succeeding data word. This first bit location corresponds to the word separation interval. As has been described hereinabove with respect to FIGS. 3 and 7, a LOAD signal is generated during this word separation interval. Accordingly, when a storage location is available to store a new data word, the signals applied to the NOT AND gate 502 by the first two stages of the shift register 302 are each low signals resulting in a high signal supplied to the NAND gate 504. The high LOAD signal now supplied to the NAND gate 504 results in a low signal transmitted to the NOT AND gate 506 by the NAND gate 504. Accordingly, the NOT AND gate 506 is now supplied with a low signal at each of its input terminals to thereby produce a high output signal.

The high signal produced by the NOT AND gate 506 effectively retriggers the one-shot circuit 520 to maintain that circuit in its unstable state. That is, the output signal produced by the one-shot circuit remains as a low signal and the timing cycle for the one-shot circuit is reinitiated. Thus, the one-shot circuit 520 is prevented from being restored to it stable state, and, thus, does not produce a high output signal. By supplying a low signal to the NAND gate 522, the light emitting diode 32 is reverse biased so that current does not flow from the source of energizing potential through the diode. Consequently, the light emitting diode is not energized and the "OVERLOAD" indication is not provided.

The high signal produced by the NOT AND gate 506 is additionally supplied to the AND gate 508. This AND gate is additionally supplied with the high ENTER signal that has been produced by the enter flip-flop circuit 262 to thereby apply a high signal to the NOT OR gate 512. The NOT OR gate operates to supply a low input signal to the NOR gate 516, resulting in the production of a high output signal by that NOR gate, as diagrammatically represented in FIG. 9. It is appreciated that, in view of the cross-coupling between the NOR gates 516 and 518, that a high output signal at the NOR gate 516 causes the NOR gate 518 to produce a low output signal. This low output signal is supplied as a reset signal to the word counter 240 to reset that counter to its initial count. It is recalled that the word counter operates so as to cease its counting operation when the count of 64 is reached. Further, when the count of 64 is attained, the 64 output terminal of the word counter supplies a low signal to the coincidence circuit 332. Accordingly, the coincidence circuit is disabled from supplying further timing pulses to the word counter, thereby maintaining the counter 240 at the count of 64. However, now that the reset signal is produced by the NOR gate 518, the counter 240 is reset to its initial count whereby the 64 output signal supplies a high enabling signal to the coincidence circuit 332. The coincidence circuit is now enabled to supply timing pulses to the timing pulse input terminal of the word counter 240. This operation of the coincidence circuit 332 is diagrammatically represented in FIG. 9.

Thus it is seen that when an available storage location is shifted into the first word position of the recirculating data stream, a high signal is produced by the NOT AND gate 506, resulting in the actuation of the flip-flop circuit formed of the cross-coupled NOR gates 516, 518. Furthermore, the word counter 240 is reset to an initial count and is now enabled to count the timing pulses supplied thereto by the coincidence circuit 332. It is appreciated that the count exhibited by the word counter is now incremented in synchronism with the shifting of the available storage location through the recirculating data stream. Hence, the word counter serves to track that storage location as it advances through the recirculating memory 206.

When the NOR gate 516 produces a high output signal, that signal is inverted by the inverting circuit 528 and is supplied as a low forward biasing signal to the light emitting diode 30. Consequently, current is now permitted to flow from the source of energizing potential through the forward-biased light emitting diode to provide a COMMAND ENTERED indication to an operator. This serves to apprise the operator that the function and time data selected by the operation of a particular function switch and by suitably advancing the clock display has been entered into the recirculating memory 206. The manner in which this data is entered into the memory has been previously described. However, to complete the present explanation, a discussion of this operation will be briefly reiterated.

Figure 9:
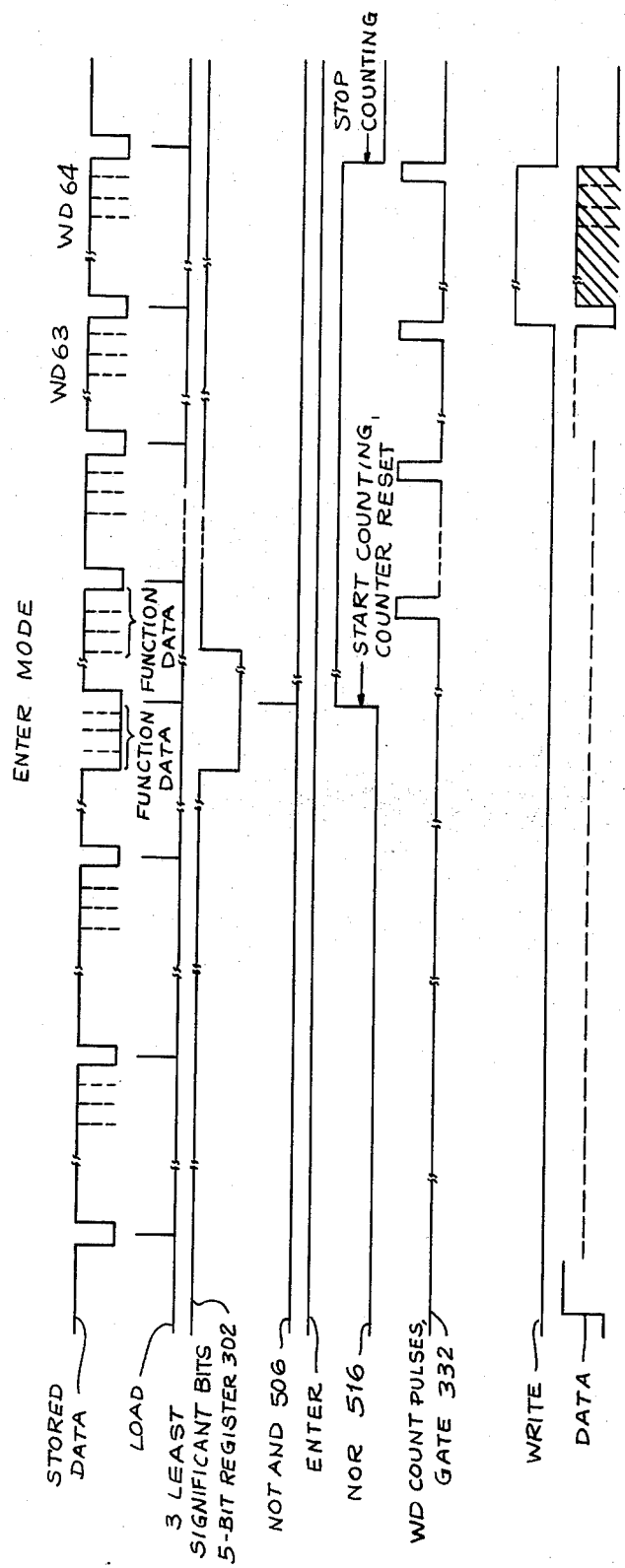
FIG. 9 is a waveform diagram that is useful in explaining another mode of operation of the programmer apparatus.

With reference to FIG. 2, it is recognized that, as the word counter 240 is incremented, the count exhibited thereby represents the position in the recirculating data stream in which the available storage location is then disposed. When that storage location is fully shifted into the last word location in the data stream, the word counter 240 is incremented to a count of 63. Accordingly, a low signal is supplied to the NOR gate 224 from the 63 output terminal of the word counter, resulting in a high WRITE signal supplied to the WRITE input terminal of the memory 206. Therefore, the preselected function and time data that is serialized by the multiplexing circuit 202 is now supplied through the NOR gate 212, the NAND gate 214 and the inverting circuit 218 to the DATA IN terminal of the memory 206 whereat this serialized data is now written into the memory. This write in operation of the data is represented in FIG. 9. It is seen that the first data bit which corresponds to the word separation interval is shifted into the memory input stage as the first data bit position of the available storage location is shifted out of the output stage. Hence, the serialized function and time data is now written in to the storage location in the recirculating data stream that had been detected as being available to store a data word. Stated otherwise, when the available storage location has traversed the entire data stream, it is returned to the initial word position in that stream and is now replaced, or filled, with the serialized function and time data.

It may be recognized that, as the recirculating data stream is recirculated through the memory 206, the function and time data selected by the operator is continually serialized and applied to the DATA IN terminal of the memory. That is, this serialized function and time data is supplied to the DATA IN terminal in synchronism with the shifting of a data word into the first word position of the memory. However, until a WRITE signal is supplied to the WRITE terminal of the memory, this data applied to the DATA IN terminal is not written in to the memory, and thus has no effect upon the contents of the memory.

Referring again to FIG. 5, it is seen that if no storage location in the recirculating memory 206 is available to store a new data word, the NOT AND gate 506 will not produce a high output signal. Accordingly, the one-shot circuit 520, which had been actuated upon the operation of a function switch, will now "time out". That is, the predetermined interval established for the one-shot circuit will expire prior to the receipt by the one-shot circuit of any retriggering pulses. When this predetermined interval expires, a high signal is supplied to the NAND gate 522. Also, if a function switch is actuated in an attempt to store data in the memory, a low signal is supplied to the NAND gate 521 which, in turn, is supplied as a high signal to the NAND gate 522. THE NAND gate 522 is now supplied with a high signal at each of its unput terminals to thereby supply a low forward-bias signal to the light emitting diode 32. As the light emitting diode is forward-biased, current flows from the source of energizing potential through the light emitting diode to thus provide a visual indication. that the recirculating memory 206 is not capable of storing an additional data word.

To permit the gates 502, 504 and 506 to examine each storage location that circulates through the memory 206, it is recognized that the predetermined interval established for the one-shot circuit should be at least equal to a memory recirculating cycle. Of course, an additional margin of safety is provided by establishing the predetermined interval for the one-shot circuit as equal to about two memory recirculating cycles. Accordingly, it is seen that, after twice examining each storage location in the recirculating memory 206, if the available storage location detector 206 does not sense the availability of a storage location to store a new data word, the light emitting diode 32 is activated to visually apprise the operator that the preselected data word cannot be entered.

It is also seen that if the NOT AND gate 506 does not produce a high output signal, the NOT OR gate 512 does not supply a low signal to the NOR gate 516, and the NOR gate 518 maintains a high signal at its output terminal. Consequently, the word counter 240 is not reset and is not enabled to count timing pulses supplied by the timing control circuit 242. Additionally, the light emitting diode 30 is supplied with a high reverse bias signal and current cannot flow through this light emitting diode. Consequently, a COMMAND ENTERED indication is properly not provided. If an operator persists in entering the preselected data word into the memory 206, it is first necessary to erase at least one data word from its memory storage location. This operation is achieved in the CHANGE mode, as will now be described.

It is recognized that, when a data word is to be erased from the memory, the function and time data represented by that word must first be selected by an operator pursuant to the operation of a corresponding function switch and by suitably advancing the clock display to a corresponding time indication. When the appropriate function and time data have been selected, the comparator circuit 208, as illustrated in FIG. 4, will operate to detect the stored data word that is in exact correspondence with the selected function and time data word. It is recalled, when a favorable comparison is made between the stored word and the selected data, the flip-flop circuit 414 produces a high CHANGE OK signal.

Figure 10:
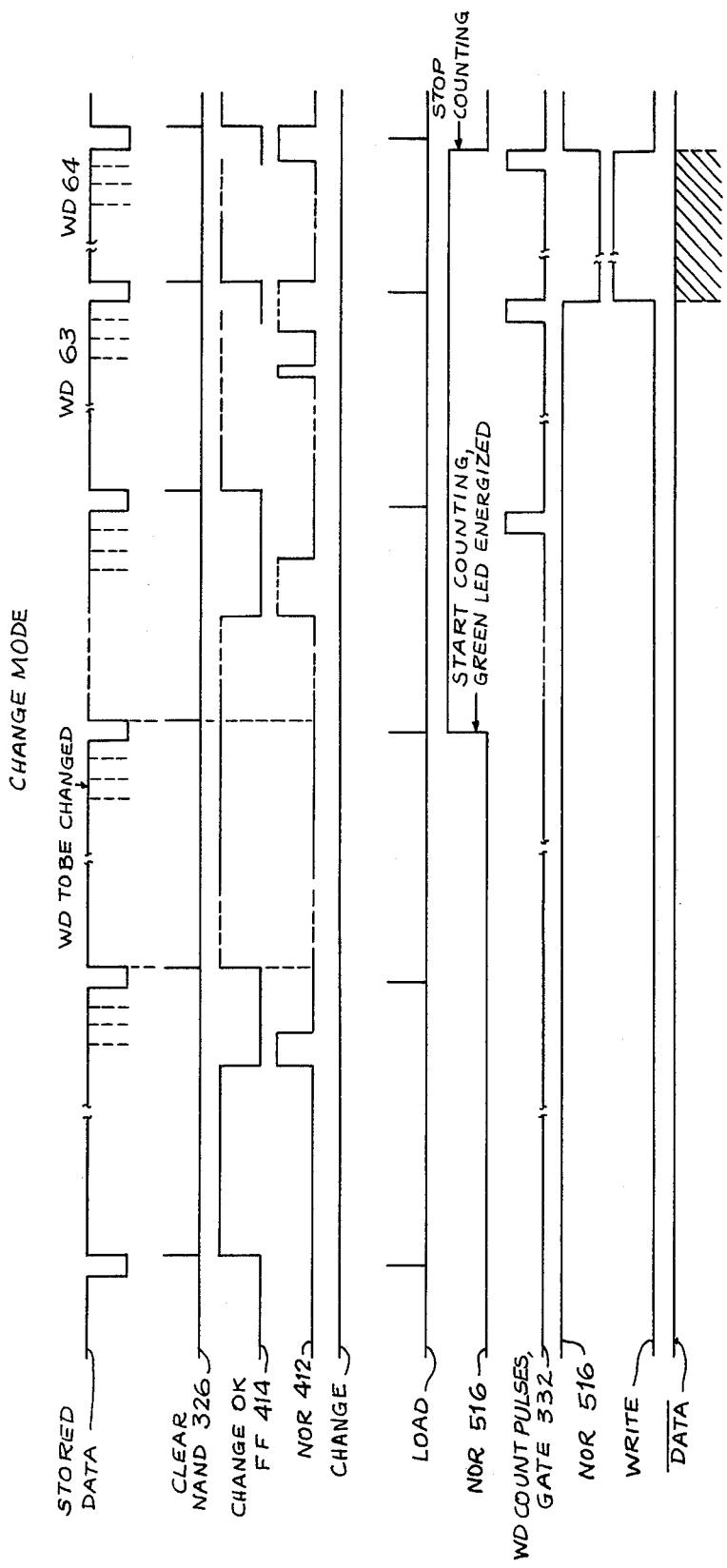
FIG. 10 is a waveform diagram that is useful in explaining a still further mode of operation of the programmer apparatus.

As is seen from FIG. 5, the CHANGE OK signal is supplied to the NAND gate 514, together with the CHANGE signal produced by the change flip-flop circuit 264 and the LOAD pulse produced by the timing control circuit. Since the LOAD pulses are produced during the first bit interval of each data word, i.e., the word separation interval, it is appreciated that when the preselected stored word is located, the NAND gate 514 supplies a low input signal to the NOR gate 516. Consequently, the NOR gates 518 and 516 operate in the manner described above to thereby supply a low reset signal to the word counter 240 and to additionally forward-bias the light emitting diode 30. Thus, when the preselected word is located, a COMMAND ENTERED visual indication is provided. Also, the word counter is reset to its initial count and is now enabled to receive timing pulses and to count such pulses as supplied by the coincidence circuit 332. The cooperation between the flip-flop circuit 414, the NAND gate 514, the NOR gate 516 and the word counter 240 is diagrammatically represented in FIG. 10.

It is now recognized that, when the identified stored word is shifted from the first word location through the recirculating data stream into the sixty-third word location, the word counter 240 attains the count of 63. Hence, and as previously described, the WRITE signal is supplied to the WRITE terminal of the memory 206. Also, as previously discussed, during the CHANGE mode, the NAND gate 214 produces a predetermined code consisting of successive high signals. This obtains because of the low $\overline{\text{CHANGE}}$ signal supplied to the NAND gate. After inversion, the memory 206 is supplied with consecutive low signals at its DATA IN terminal, which signals are written into the first word location in the recirculating data stream when the WRITE signal is applied to the WRITE terminal of the memory. Hence, instead of recirculating the selected data word from the last word location to the first word location in the memory, the predetermined code is written into the first word location. That is, this predetermined code replaces the selected data word. Accordingly, since at least one storage location in the recirculating data stream now consists of consecutive low signals, it is appreciated that this storage location is available to store a data word. An operator may now store a preselected data word in that storage location by now operating the programmer apparatus in its ENTER mode, as aforedescribed.

Although the ERASE mode of operation wherein the entire contents of the recirculating memory 206 are erased has been described above, it is here noted that, when the high erase signal is produced by the erase flip-flop circuit 266, the AND gate 510 supplies a high signal to the NOT OR gate 512 upon the occurrence of the LOAD pulse. Since the LOAD pulse is produced during the first data bit interval of each data word, it is seen that during each mode of operation, including the ERASE mode, the RESET signal is supplied to the word counter 240 by the NOR gate 518 at the start of a data word.

In the ERASE mode, as each stored word is shifted from the last word location of the recirculating memory 206, it is not returned to the first word location. Instead, as described above, each stored word is replaced by the predetermined code consisting of consecutive low signals.

Figure 11:
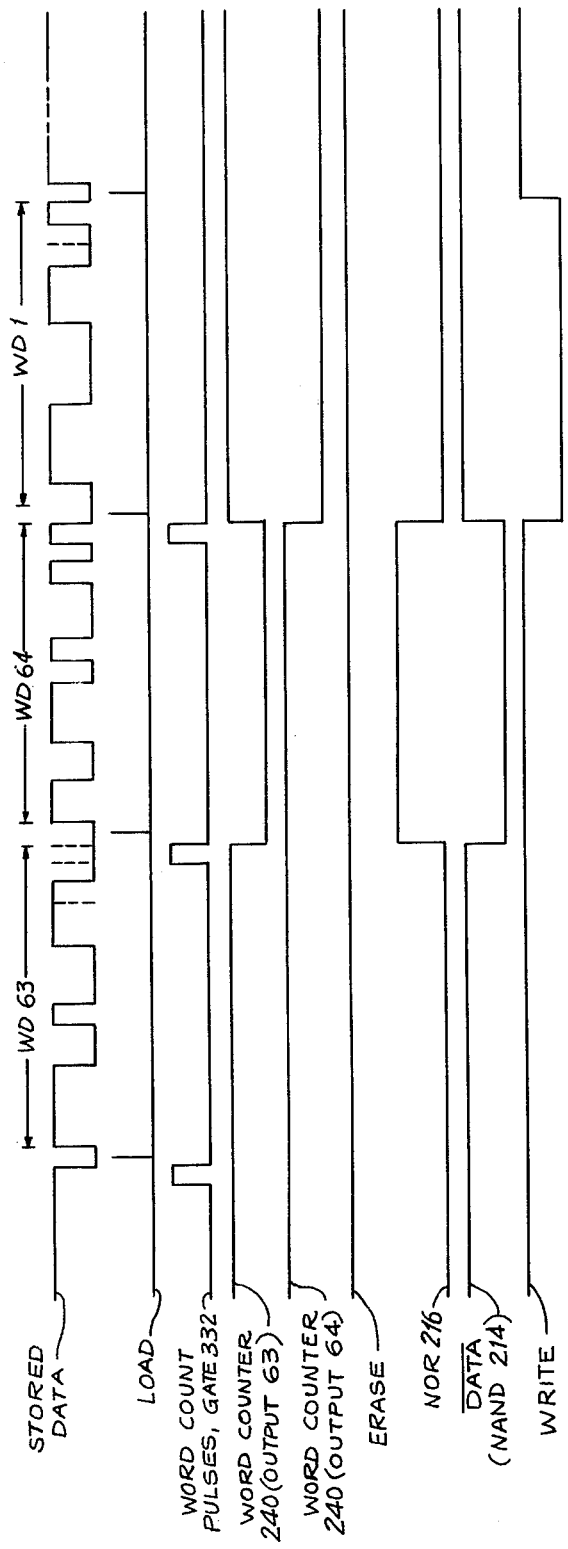
FIG. 11 is a waveform diagram that is useful in explaining yet another mode of operation of the programmer apparatus.

It is recalled that, after the sixty-third stored word has been replaced by the predetermined code, the word counter 240 is incremented to the count of sixty-three, whereby the 63 output is provided with a low signal, as shown in the waveforms of FIG. 11. Consequently, the NOR gate 216 supplies a high signal to the NAND gate 214 such that, during the interval required to shift a sixty-fourth data word into the first storage location, the NAND gate, in combination with the inverter circuit 218, supplies the predetermined synchronization word (hence consisting of consecutive high signals) to the DATA IN terminal of the memory 206. When the synchronization word has been fully written into the memory 206, the word counter 240 increments to exhibit a count of 64. Thus, the 64 output terminal of the word counter is provided with a low signal, whereby the WRITE signal is terminated, the coincidence circuit 332 is disabled and the word counter is maintained at this count. Thus, in the ERASE mode, each storage location of the memory 206 is effectively erased and replaced by a predetermined code representing the availability of that storage location to receive a new data word; and one of the storage locations is provided with a synchronization word.

FUNCTION CONTROL

Figure 6:
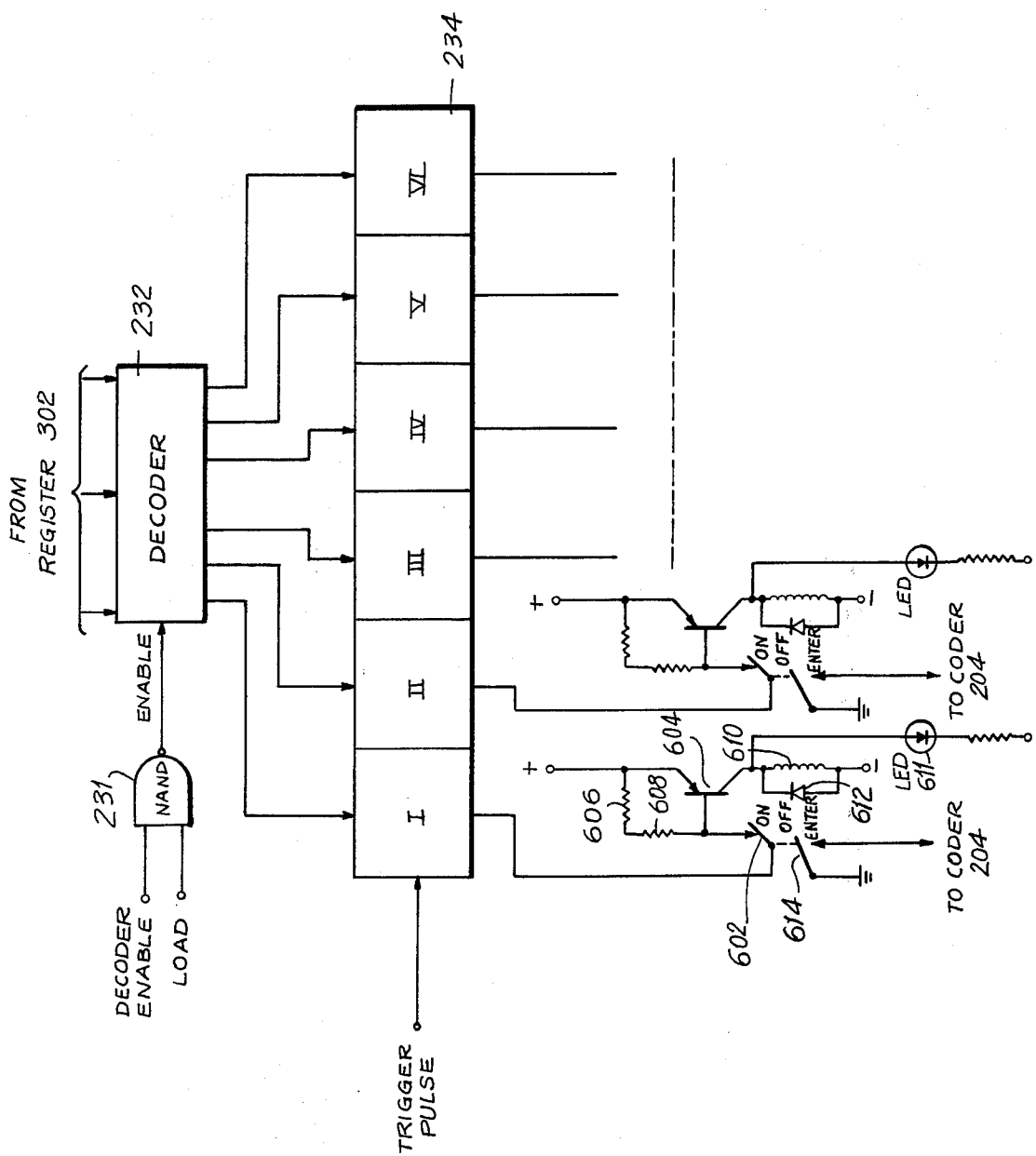
FIG. 6 is a partial logic and partial schematic diagram of a function actuating circuit of the programmer apparatus.

Referring now to FIG. 6, there is illustrated a partially schematic, partially block diagram of a preferred embodiment of the function control circuit. The function control circuit is comprised of a decoder circuit 232, and relay control register 234, as described hereinabove, with respect to FIG. 2, together with a plurality of output control circuits. In particular, the decoder circuit 232 is connected to the output terminals of the first three stages of the shift register 302 described above with respect to FIGS. 3 and 5. The decoder circuit is thus adapted to receive the function data portion of a data word as that portion is temporarily stored in the shift register 302. The decoder circuit 232 includes an ENABLE input terminal coupled to a NAND 231, the NAND gate being supplied with the LOAD pulses produced by the timing control circuit and with the DECODER ENABLE signal produced by the flip-flop circuit 416, described above with respect to FIG. 4.

As aforenoted, the decoder circuit 232 comprises a gating network adpated to produce an output signal on one of the decoder circuit output terminals as determined by the function represented by the coded function data. In an alternative embodiment, the decoder circuit comprises a conventional matrix decoder.

The relay control register 234 is comprises of a plurality of storage stages, such as a plurality of flip-flop circuits, each being connected to an associated one of the decoder circuit output terminals. Each of the storage stages includes an enable input terminal, such as a trigger pulse input terminal, connected in common to receive a trigger pulse signal. Accordingly, each storage stage is adapted to store a signal supplied thereto by the decoder circuit 232 if a trigger pluse signal is applied to the enable input terminal of the stage.

Each storage stage includes an output terminal that is connected to an associated output circuit. The output control circuits are all substantially similar, and only the circuit connected to stage I will be described in detail. The output control circuit includes an energizable device 610 which comprises an energizing coil of a relay, solenoid, or the like. The energizing coil 610 is connected in parallel with a suppression diode 612 in the conventional manner. The coil 610 is connected in the collector circuit of a transistor 604. As illustrated, the series circuit formed of the transistor and the coil is connected to a suitable source of energizing potential. In addition, a visual indicator, such as an LED 611, also is connected between the collector electrode of the transistor 604 and the source of energizing potential to provide a visual indication of a function to be performed. Typically, if the transistor 604 comprises a P-N-P transistor, the emitter electrode of the transistor is connected to a source of relatively positive potential and the collector electrode of the transistor is connected through the coil 610 to a source of relatively negative potential. Of course, if the transistor comprises an N-P-N transistor, the indicated polarities of the sources of energizing potential are reversed. Additionally, the coil 610 may be connected in the emitter circuit of the transistor. Although not shown herein, a switch can be connected in series with the coil and adapted to be closed only when the CONTROL mode of operation is selected.

Biasing resistors 606 and 608 are connected to the base electrode of the transistor 604 and are adapted to establish a predetermined bias potential whereby the transistor is normally rendered non-conductive. The base of the transistor is additionally connected to a switch 602, the switch being adapted to receive a signal produced at the output terminal of the stage I of the relay control register 234. It may be appreciated that the switch 602 is mechanically coupled to a corresponding function switch, such as function switch 14 associated with the function I. A further switch 614 is connected to a source of reference potential, such as ground, and is adapted to be mechanically linked to the function switch 14. It may be seen that, when the function switch 14 is operated on its ON condition, the switch 602 is connected to the base electrode of the transistor 604, and the switch 614 is electrically isolated. When the function switch 14 is operated to its OFF condition, both the switches 602 and 614 are isolated. That is, the switch 602 is no longer connected to the base electrode of the transistor 604. When the function switch 14 is operated to its ENTER condition, the switch 602 remains isolated but the switch 614 is now connected to the coding circuit 204 and, additionally, to the aforedescribed NAND gate 521 of the available storage location detector. In this fashion, the switch 614 is adapted to supply the reference potential to the coding circuit, whereby a coded representation of the operated function switch is produced, and to the detector, whereby the aforenoted OVERLOAD condition can be indicated.

The operation of the illustrated function control circuit will now be described in conjunction with the graphical representation depicted in FIG. 8. It is recalled that, in the CONTROL mode, when the time data derived from the clock display 12, representing the actual time of day, favorably compares to the time data portion of a stored data word, the DECODER ENABLE signal is produced by the flip-flop circuit 416 of FIG. 4. The DECODER ENABLE signal will coincide with the LOAD pulse that occurs immediately following the data word having the time data portion that favorably compares with the actual time of day as represented by the clock display. Thus, when the LOAD pulse is produced, the function data bits of that stored data word will be stored in the first three stages of the register 302 and will thus be supplied to the decoder circuit 232.

Figure 8:
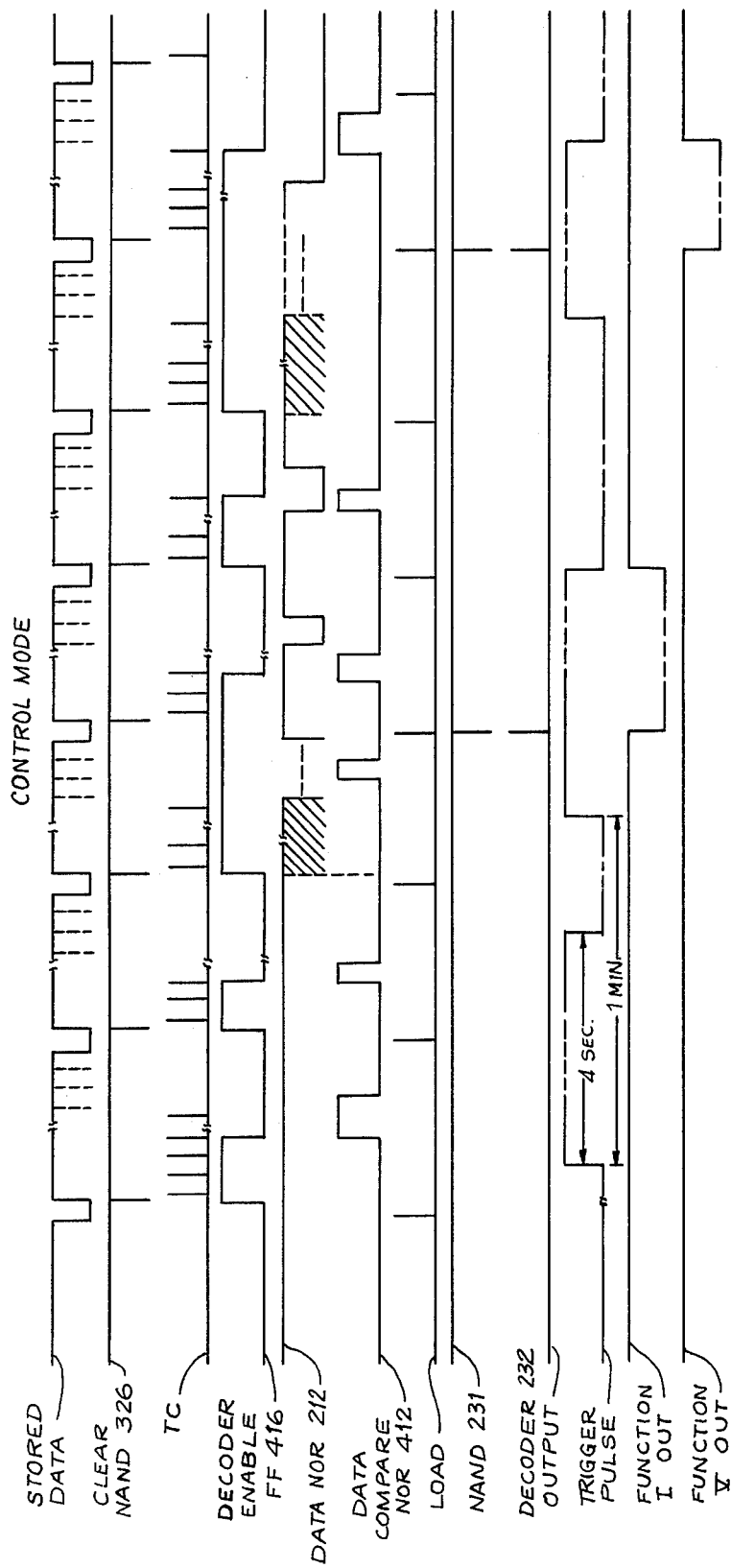
FIG. 8 is a waveform diagram that is useful in explaining a mode of operation of the programmer apparatus.

As indicated in FIG. 8, the NAND gate 231 produces a low ENABLE signal when the DECODER ENABLE signal and the LOAD pulse coincide. The decoder circuit 232 is thus enabled to decode the coded function data supplied by the register 302 to produce an output signal at a corresponding one of its output terminals. For example, if it is assumed that, function I is to be performed at the time then obtaining, the decoder circuit 232 will supply an output signal to stage I of the relay register 234, as depicted in FIG. 8. Now, if a trigger pulse signal is supplied to the relay register, the signal supplied by the decoder circuit 232 will be stored in stage I. Consequently, an appropriate output signal will be supplied from the stage I to the switch 602 to the base electrode of the transistor 604, provided the switch 602 is positioned at its ON contract. The signal thus supplied to the transistor biases that transistor to its conductive state such that current flows through the emitter-collector circuit and thus through the relay coil 610. In the illustrated embodiment wherein the transistor 604 is a P-N-P transistor, the signal supplied through the switch 602 by the stage I is a low signal. In an alternative embodiment wherein the transistor 604 is and N-P-N transistor, the signal supplied by the stage I is a high signal. In either event, current that flows through the coil 610 serves to energize the relay, whereby the function I is performed. Current also flows through the LED 611 to provide a visual indication that function I is to be performed. When the control signal produced by the stage I is terminated, it is seen that the transistor 604 returns to its non-conductive state, whereby the coil 610 is no longer energized and the performance of the function I is terminated, and the LED 611 is extinguished.

As illustrated in FIG. 8, the trigger pulse signals supplied to the relay contol register 234 is a periodic signal exhibiting a predetermined duration. Typically, the repetition rate of the trigger pulse signal is one minute, and the duration of that signal is preferably four seconds. Although not shown herein, it is appreciated that the trigger pulse signal may be produced by a monostable multivibrator in response to the driving pulses supplied to the clock display 12 during the CONTROL mode of operation. When the trigger pulse signal terminates, the contents of the stage I of the relay control register 234 are cleared, thus preparing the relay control register to receive a subsequent decoded signal from the decoding circuit 232.

If the performance of the function I is to be temporarily suspended, for example, if the function I is to turn on a heating system for a public building, for instance, and if it is preferred that the heating function not operate when the building is not is use, the switch 602 is operated to its OFF position. Thus, the decoded function data that is represented by the output signal produced by the stage I is not supplied to the base electrode of the transistor 604. Consequently, that transistor will not be rendered conductive, the coil 610 will not be energized and the LED 611 will not be actuated. Hence, the function I will not be performed while the switch 602 is operated at its OFF position.

If, at a later time, a favorable comparison is obtained between the time and data portion of a stored word and the time data representing the actual time, as derived from the clock display, the foregoing operation will be repeated. This is, the function data associated with that stored data word will be supplied to the decoder circuit 232 simultaneously with the ENABLE signal produced by the NAND gate 231. If the coded function data is a coded representation of, for example, the function V, it is appreciated that the ENABLE signal supplied to the decoder circuit 232 will result in an output signal being transmitted to the stage V of the relay control register 234, as depicted in FIG. 8. If a trigger pulse signal is present at the time that the decoder circuit supplies a signal to the stage V, it is appreciated that the stage V will store a representation of the decoder output. Consequently, an output signal will be supplied from the stage V to the transistor in the output control circuit connected to that stage. Thus, the function coil included in that control circuit will be energized and the function V will be performed.

Although not specifically shown herein, it should be noted that the switch 614 of each output control circuit is preferably spring-biased so that, upon the operation of a selected switch, ground potential is supplied therethrough to the decoding circuit 204 for only a predetermined interval of time. It may be recognized that it is preferable to limit the duration of the function data supplied through the coding circuit 204 to the multiplexing circuit 202 so that the multiplexing circuit will be properly operated. Typically, the switch 614, when actuated, is disposed in its ENTER condition for approximately 400 milliseconds, to thereby enable the recirculating memory to undergo approximately two memory cycles. This time relationship permits each storage location of the memory to be carefully examined and, if an available location is detected, the function and time data selected by an operator may be accurately written into such location. Of course, this time relationship is merely preferable and is not intended to limit the present invention.

POWER SUPPLY

It may be appreciated that, in view of the preferred memory device employed in the programmer apparatus in accordance with the present invention, it is highly desirable to maintain a substantially constant power supply to the memory device, even in the event of a power failure. This is achieved in accordance with the preferred power supply, as illustrated in FIG. 12.

It is recognized that the various circuits employed in the programmer apparatus of the present invention are energized by various DC energizing potentials. Such DC energizing potential are derived from a commerical AC power source by the illustrated power supply which comprises a transformer 702, a rectifier 710, a voltage regulator and a battery 740. The transformer 702 includes an input winding 704 adapted to receive AC power supplied by, for example, a conventional AC power source, an output winding 706 having a center tap 708. It is appreciated that the input and output windings comprise primary and secondary windings, respectively, of the transformer 702.

The opposite ends of the winding 706 are connected to input terminals of a rectifier 710. The rectifier is a full-wave bridge rectifier of conventional construction having output terminals 712 and 714. In the illustrated configuration, the rectifier 710 is adapted to rectify the AC current supplied thereto by the winding 706 so as to produce an output DC voltage of predetermined polarity.

In the arrangement illustrated in FIG. 12, the DC voltage provided at the output terminal 712 is relatively positive and the DC voltage provided at the output terminal 714 is relatively negative, both with respect to a reference potential, such as ground. The output terminal 712 of the rectifier 710 is connected via a conductor 716 to a power source output terminal 742. This output terminal supplies the positive energizing potential for the various circuits described above.

The DC potential provided across the rectifier output terminals 712 and 714 is maintained at a substantially constant value by the voltage regulator connected between conductors 716 and 718, the latter being connected to the rectifier output terminal 714. The voltage regulator is comprised of a zener diode 728 connected in series with a resistor 730, the series circuit being connected across the conductors 716 and 718. The junction defined by the zener diode and the resistor is connected to the base electrode of a transistor 726. This transistor is connected via a capacitor 724 to the conductor 716 and, additionally, by a conductor 720 to the center tap 708 of the winding 706. A further capacitor 722 is connected in parallel with the series combination of the capacitor 724 and the transistor 726. This voltage regulator circuit thus maintains a substantially constant DC potential across the conductors 716 and 718 and across the power source output terminals 742 and 744. As illustrated, the regulated positive DC energizing potential is supplied to logic circuits 750. It is understood that these logic circuits include the various circuits depicted in FIG. 2. Also, the regulated positive DC energizing potential is supplied to the memory device 40 which, in the preferred embodiment, comprises the recirculating memory 206.

As noted hereinabove, it is preferred to maintain a regulated DC energizing potential even in the event of a power failure at the AC power source. By so maintaining such an energizing potential, the programmer apparatus may maintain its operation notwithstanding the occurrence of a power failure. This is achieved by producing a DC battery 740 across the power source output terminals 742 and 744. In a preferred embodiment, this battery is a rechargeable DC power source having a positive terminal connected to the conductor 716 and having a negative terminal connected to the conductor 718 by a series circuit comprised of a resistor 732 and a rectifier 734. The rectifier 734 is in the form of a diode that is forwardbiased such that the rechargeable battery is "trickle-charged" during normal operation of the illustrated power source. A capacitor 736 is connected in shunt relationship with the battery. The battery 740 is maintained in ready condition so as to supply adequate DC power to the illustrated circuits in the event of an AC power failure.

The power source output terminals 742 and 744 are, as illustrated, connected to a clock drive circuit 760 and to a pulse generator 770. The clock drive circuit is adapted to be supplied with CLOCK ADVANCE pulses when the clock display 12 is operated to indicate the actual time of day then obtaining. Accordingly, the clock drive circuit is capable of driving the clock display which is advanced under the control of such CLOCK ADVANCE pulses. The clock drive circuit 760 comprises conventional amplifiers to so drive the digital clock mechanism. The CLOCK ADVANCE pulses are generated by any conventional timing pulse generating device capable of producing one clock pulse per minute. These CLOCK ADVANCE pulses are supplied to the clock drive circuit 760 via a switch 762 that is selectively positioned at an ON contract 764 and an OFF contact 766. It is appreciated that the switch 762 corresponds to the mode selecting switch 24. Accordingly, when the movable contact 762 engages its OFF contact 766, the CLOCK ADVANCE pulses are no longer supplied to the clock drive circuit 760, and the clock display 12 no longer reflects the actual time of day. That is, the clock display is no longer driven by the CLOCK ADVANCE pulses that are produced by the timing pulse generating device.

The pulse generator 770 is adapted to provide master clock pulses to the timing control circuit 242. The pulse generator is comprised of an accurately controlled oscillator circuit, such as an astable multivibrator, capable of supplying the positive-going A timing pulses as well as the negative-going B timing pulses, described above. The pulse generator 770 additionally comprises a monostable multivibrator that is responsive to each CLOCK ADVANCE pulse to generate the trigger pulses previously described with respect to FIG. 6. The pulse generator is comprised of conventional circuits and no further description thereof need be provided.

While the present invention has been described with reference to a certain preferred embodiment, it is apparent that various changes and modifications can be made. For example, in an alternative embodiment, the function and time data that is derived from the operation of the function switches and the clock display is, instead, produced by other apparatus, including conventional data processing devices, such as a keyboard device, a data tape reader, a punched card may be prepared by an operator in conventional manner.

In another alternative embodiment of the present invention, the described operation of the various circuits is attained by utilizing alternative logic circuits, such ad AND gates, OR gates, and the like. Those or ordinary skill in the art will recognize that such alternative logic circuitry may be used for the particular devices described and illustrated herein. Also, such alternative logic circuits can operate either as "positive" logic circuits or "negative" logic circuits, in conventional manner.

Also, in another embodiment of the present invention, an alternative coding scheme of time and function data is provided. It is clear that any desirable coding configuration, conventionally employed by those of ordinary skill in the logic circuitry art, can be used with the present invention. Consistent with the particular coding scheme adopted, a data word length may be comprised of any convenient number of data bits. Furthermore, as the capacity of the memory device is expanded, the total number of stored data words will likewise increase. As noted above depending upon the particular coding scheme for the function data bits that is adopted, a data word may be associated with more than one predetermined function. In a still further embodiment of the present invention, the time data and the function data are not combined in data words. Instead, the time data is stored in one memory device and the function data is stored in another memory device, the memory devices being operable in unison and in synchronism. Also, such separate memory devices may, in fact, comprise a single memory device having separable portions for the time and function data.

Therefore, it will be obvious to those skilled in the art that the foregoing and various other changes and modifications in form and details may be made without departing from the spirit and scope of the invention. It is intended that the appended claims be interpreted as including all such changes and modifications.

What is claimed is:

1. A method of controlling the selective performance of a plurality of predetermined functions at preselected times, comprising the steps of:
generating time and function data presenting functions to be performed and the times at which said functions are to be performed;
storing said time and function data;
generating time of day data representing the time of day then obtaining;
regularly comparing said generated time of day data to all of said stored time data; and
initiating the performance of a function represented by that function data associated with said stored time data which compares with said generated time of day data.

2. The method of claim 1 wherein said step of generating time and function data comprises the steps of selectively advancing a clock mechanism to indicate a preselected time; producing time data corresponding to said time indicated by said clock mechanism; and manually actuating at least one of a plurality of function switches to produce function data identifying the particular function to be performed at said time indicated by said clock mechanism.

3. A method of controlling the selective performance of a plurality of predetermined functions at preselected times, comprising the steps of:
generating time and function data representing a function to be performed and the time at which said function is to be performed;
combining said time and function data into a data word;
detecting whether storage means includes an available word storage location capable of storing said data word;
storing said data word in said available storage location;
generating time of day representing the time of day then obtaining;
regularly comparing said generated time of day data with all of the data words stored in said storage means; and
initiating the performance of a function represented by the function data of a data word when the time data of said data word compares with said generated time of day data.

4. The method of claim 3 wherein said step of detecting the availability of a storage location comprises the steps of examining at least a predetermined portion of each storage location in said storage means; sensing whether said examined portion includes a given code representing the availablility of said location to store a data word; and providing an indication of the availability of said location.

5. The method of claim 4 wherein said step of detecting the availability of a storage location further includes the steps of continually recirculating all of the data words stored in said storage means, sensing which of said recirculating data words includes said given code; and identifying the first of said recirculating data words which includes said given code.

6. The method of claim 5 wherein said step of storing said data word comprises the step of replacing said identified recirculating data word with said generated data word.

7. A method of controlling the selective performance of a plurality of predetermined functions at preselected times, comprising the steps of:
continually recirculating stored data words representing the particular functions to be performed and the times of day at which said respective functions are to be performed;
generating a data word, including function data and time data, corresponding to a recirculating stored data word, when the particular function represented by said stored data word is no longer to be performed;
comparing each of said recirculating data words to said generated data word;
replacing that recirculating data word which compares to said generated data word with a predetermined code; and
initiating the performance of a function represented by a recirculating data word when the actual time of day then obtaining corresponds to the time of day represented by said recirculating data word.

8. The method of claim 7 wherein said step of replacing said recirculating data word with a predetermined code comprises the steps of identifying the recirculating data word which compares to said generated data word; tracking said identified data word as it recirculates; and replacing said identified data word with said predetermined code when it advances to a pre-established location.

9. Programmable apparatus for controlling the selective performance of a plurality of predetermined functions at preselected times, comprising:
input means for producing function data representing a function to be performed and time data representing a time at which said function is to be performed;
memory means for storing said function data and said time data;
clock means for generating indicia representing the time of day then obtaining;
comparator means coupled to said memory means and responsive to said generated indicia for determining when the time of day corresponding to stored time data is attained; and
function actuation means responsive to said comparator means for initiating the performance of that function associated with said stored time data when said time of day corresponding to said stored time data is attained.

10. The apparatus of claim 9 wherein said input means comprises:
manually operable switch means for producing said function data when operated; and
a settable clock operable in a first mode to be set to display any predetermined time, and operable in a second mode to be controlled so as to display the actual time of day; said settable clock producing time signals corresponding to the time displayed thereby.

11. Programmable apparatus for controlling the selective performance of a plurality of predetermined functions at preselected times, comprising:
memory means for storing data words each including function data representing a predetermined function to be performed, and time data representing the preselected time at which said predetermined function is to be performed;
clock means for generating time data representing the time of day then obtaining;
comparator means coupled to said memory means for receiving each of said stored data words, and for additionally receiving said time data generated by said clock means; for comparing said time data of said stored data words with said generated time data; and
function actuation means responsive to a favorable comparison for receiving said function data of the favorably compared stored data word and for initiating the performance of the function represented by said received function data.

12. The apparatus for claim 11 wherein said function actuation means comprises:
a plurality of energizable means, each being responsive to function data associated therewith, for performing predetermined functions determined by said function data; and
a plurality of switch means, each being associated with a corresponding one of said energizable means for rendering an associated energizable means non-responsive to said function data when said switch means is operated.

13. The apparatus of claim 12 wherein said plurality of energizable means comprises a plurality of relays, each relay being provided for a predetermined function; and wherein each of said switch means is coupled to a relay for preventing the energization of said relay when said switch means is operated.

14. In a programmer for controlling the selective performance of a plurality of predetermined functions at preselected times, apparatus for selecting a time and function to be performed, comprising:
switch means for producing function data representing the function to be performed;
settable clock means for producing time data representing the time at which said function is to be performed;
memory means for storing produced function and time data;
means coupled to said memory means for determining the availability of a storage location in said memory means to store said produced function and time data; and
write-in means coupled to said memory means and responsive to the availability of a storage location for writing into said available storage location said produced function and time data.

15. The apparatus of claim 14 wherein said means for determining the availability of a storage location comprises means for sensing a predetermined code stored in said memory means representing that the particular location at which said predetermined code is stored is available for storing said produced function and time data.

16. In a programmer for controlling the selective performance of a plurality of predetermined functions at preselected times, apparatus for selecting a time and function to be performed, comprising:
switch means for producing function data representing the function to be performed;
settable clock means for producing time data representing the time at which said function is to be performed;
recirculating memory means for storing produced function and time data and for continually recirculating data words comprised of said function and time data to thereby form a recirculating data stream;
means coupled to said recirculating memory means for sensing a predetermined coded data word representing that the particular location in said recirculating data stream at which said coded data word is stored is available for storing said produced function and time data;
means for tracking said sensed particular location; and
write-in means coupled to said tracking means for writing said produced function and time data into said particular location when said particular location is advanced to a preestablished position.

17. The apparatus of claim 16 wherein said tracking means comprises counter means coupled to said sensing means and actuated when said coded data word is sensed for exhibiting an incrementable count corresponding to the particular position of said coded data word in said recirculating data stream and for attaining a pre-established count when said coded data word is advanced to said pre-established position.

18. The apparatus of claim 17 wherein said write-in means comprises gating means coupled to said counter means and responsive to said pre-established count for generating a write-in pulse having a duration equal to the duration of a data word for enabling said produced function and time data to be written into said particular location at said preestablished position.

19. In a programmer for controlling the selective performance of a plurality of predetermined functions at preselected times, apparatus for changing such performance, comprising:
- switch means for producing function data representing the function that no longer is to be performed;
- settable clock means for producing time data representing the time at which said function was to be performed;
- memory means for storing function and time data representing all of the functions to be performed and the times of performance thereof;
- comparator means coupled to said memory means for comparing said stored function and time data with said produced function and time data; and
- means coupled to said memory means and responsive to said comparator means for effectively erasing from said memory means that function and time data which corresponds to said produced function and time data.

20. The apparatus of claim 19 wherein said means for effectively erasing comprises:
- means for generating predetermined coded data when the performance of a predetermined function at a preselected time is to be changed; and
- write-in means coupled to said memory means for replacing said stored corresponding function and time data with said predetermined coded data in response to a comparison.

21. In a programmer for controlling the selective performance of a plurality of predetermined functions at preselected times, apparatus for changing such performance, comprising:
- switch means for producing function data representing the function that no longer is to be performed;
- settable clock means for producing time data representing the time at which said function was to be performed;
- means for combining said produced function and time data for producing a data word;
- recirculating memory means for storing data words representing all of the functions to be performed and the times of performance thereof, and for continually recirculating said stored data words to thereby form a recirculating data stream;
- comparator means coupled to said recirculating memory means for comparing each stored data word with said produced data word;
- means responsive to said comparator means for identifying the particular storage location in said recirculating data stream in which said stored data word corresponds to said produced data word;
- means for tracking said identified particular location; and
- write-in means coupled to said tracking means for writing a predetermined coded word into said particular location when said particular location is advanced to a pre-established position.

22. The apparatus of claim 21 wherein said tracking means comprises counter means coupled to said identifying means and actuated when said particular storage location is identified to increment the count thereof as said identified storage location is advanced in said data stream and for attaining a pre-established count when said identified storage location is advanced to said pre-established position.

23. The apparatus of claim 22 wherein said write-in means comprises:
- control switch means operable to an active condition when the performance of a predetermined function at a preselected time is to be changed;
- means responsive to the active condition of said control switch means for supplying said predetermined coded word to said recirculating memory means; and word to said recirculating memory means; and
- gating means coupled to said counter means and responsive to said pre-established count for generating a write-in pulse having a duration equal to the duration of a data word for enabling said coded word to be written into said identified location at said pre-established position.

24. Programmable apparatus for controlling the selective performance of a plurality of predetermined functions at preselected times, comprising:
- a plurality of function control switch means, each associated with a predetermined function, and operable to a first condition for producing function data representative of said associated predetermined function, a second condition for enabling an output device to perform said predetermined function and a third condition for disabling said output device;
- clock means operable in a first mode to be set to display any preselected time, and operable in a second mode to be controlled so as to display the actual time of day, said clock means producing time data corresponding to the time displayed thereby;
- memory means for storing function and time data in the form of data words, said data words representing all of the functions to be performed and the times of performance thereof;
- comparator means coupled to said memory means for receiving each of said stored data words and for receiving said function data from said function control switch means and said time data from said clock means, said comparator means comparing each of said stored data words with said received function data and said received time data;
- mode selecting switch means for establishing a control mode whereby said predetermined functions are performed at said preselected times, a data enter mode whereby a function selected by said function control switch means and a time selected by said clock means are entered into said memory means, and a data change mode whereby a stored data word is erased from said memory means;
- function actuation means coupled to said comparator means and responsive to a favorable comparison between a stored data word and time data for receiving the function data of the favorably compared data word, said function actuation means being enabled to respond when said mode selecting switch means establishes said control mode, said function actuation means including energizable means to actuate an output device as determined by said received function data if said associated function control switch means admit of said second condition;
- means coupled to said memory means for determining the availability of a storage location in said memory means to store said function data produced by a function control means and said time data produced by said clock means, said means for determining being enabled when said mode selecting switch means establishes said data enter mode;

identifying means responsive to said comparator means for identifying the particular storage location in said memory means in which said stored data word corresponds to said function and time data produced by said function control means and said clock means, said identifying means being enabled when said mode selecting switch means establishes said data change mode; and write-in means coupled to said memory means and being responsive to the determining means for writing into said available storage location said produced function and time data, and being responsive to said identifying means for writing into said identified storage location a predetermined coded word.

25. The apparatus of claim 24 wherein said memory means comprises recirculating memory means for forming a recirculating data stream comprised of said data words.

26. The apparatus of claim 25 further comprising counter means coupled to said determining means and to said identifying means and selectively actuated when said available storage location is determined or said particular storage location is identified, to increment the count thereof as said storage location is advanced in said data stream.

27. The apparatus of claim 26 wherein said write-in means comprises gating means coupled to said counter means and responsive to a pre-established count attained by said counter means for generating a write-in pulse having a duration equal to the duration of a data word and for enabling one of said produced function and time data and said predetermined code word, depending upon the mode established by said mode selecting switch means, to be written into said recirculating memory means at the location associated with said pre-established count.

28. The apparatus of claim 25 wherein said recirculating memory means includes a synchronization word at a predetermined location in said data stream.

29. The apparatus of claim 28 further comprising:
timing control means for cyclically generating timing pulses to synchronize the operations of said recirculating memory means, said comparator means, said function actuation means, said means for determining, said identifying means and said write-in means; and
synchronization word detecting means coupled to said recirculating memory means for detecting said synchronization word and for resetting said time control means to an initial point in its cycle.

30. In a programmer for controlling the selective performance of a plurality of predetermined functions at preselected times and including a memory for storing data words representing such functions and times, apparatus for erasing said memory, comprising:
erase switch means for producing a predetermined code when actuated;
write-in means for gating said predetermined code into each storage location of said memory; and
circuit means for writing a synchronization code into a predetermined storage location of said memory.

31. The apparatus of claim 30 wherein said memory comprises recirculating memory means for continually recirculating said stored data words to thereby form a recirculating data stream.

32. The apparatus of claim 31 wherein said write-in means comprises gating means for sequentially replacing each recirculating data word with said predetermined code.

33. The apparatus of claim 32 wherein said circuit means comprises:
counter means activated in response to the actuation of said erase switch means for incrementing the count thereof as each data word is advanced in said data stream; and
means for controlling said gating means to replace a data word with said synchronization code when said counter means attains a pre-established count.

34. In a programmer for controlling the selective performance of a plurality of predetermined functions at preselected times and including a memory for storing data words representing such functions and times, a power supply, comprising:
an A.C. power source;
means coupled to said A.C. power source for converting A.C. power to D.C. power;
voltage regulator means coupled to the converting means for supplying regulated D.C. power to output terminals; and
rechargeable D.C. battery means coupled to said output terminals for supplying D.C. power in the event of an A.C. power failure, said battery means being connected to said memory for normally supplying power thereto.

35. In a programmer for controlling the selective performance of predetermined functions at preselected times and including a memory for storing data words representing such functions and times, said memory additionally storing a synchronization word, apparatus comprising:
means for determining when the actual time of day corresponds to a data word for initiating the performance of the function associated with said data word;
timing control means for cyclically generating timing pulses to control the operation of said last-mentioned means in a synchronized timed relation;
main power source means for supplying operating power to said programmer;
auxiliary power source means for supplying operating power to said programmer in the event of a power failure of said main power source means; and
resynchronization means coupled to said memory for detecting said synchronization word and for resetting said timing control means to a predetermined point in its cycle in response thereto;
whereby the operation of said means for determining and initiating is resynchronized to said timed relation after the occurrence of said power failure.

* * * * *